(12) United States Patent
Eggert et al.

(10) Patent No.: US 10,093,051 B2
(45) Date of Patent: Oct. 9, 2018

(54) METHODS OF JOINING

(71) Applicant: Andersen Corporation, Bayport, MN (US)

(72) Inventors: Jim Eggert, Burnsville, MN (US); Dale Thompson, West St. Paul, MN (US); Paul Machacek, Oakdale, MN (US); James T. Weglewski, St. Paul, MN (US); Bryan Kendall, River Falls, WI (US); Troy Rubenzer, Hudson, WI (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 15/596,745

(22) Filed: May 16, 2017

(65) Prior Publication Data
US 2017/0246780 A1 Aug. 31, 2017

Related U.S. Application Data

(60) Division of application No. 14/150,011, filed on Jan. 8, 2014, now Pat. No. 9,649,795, which is a
(Continued)

(51) Int. Cl.
| | |
|---|---|
| *B29C 45/14* | (2006.01) |
| *B29C 70/84* | (2006.01) |
| *E06B 3/96* | (2006.01) |
| *E06B 3/968* | (2006.01) |
| *B29L 12/00* | (2006.01) |
| *B29L 31/00* | (2006.01) |
| *B29K 105/20* | (2006.01) |

(52) U.S. Cl.
CPC ........ *B29C 45/14467* (2013.01); *B29C 70/84* (2013.01); *E06B 3/9612* (2013.01); *E06B 3/9682* (2013.01); *B29K 2105/20* (2013.01); *B29L 2012/00* (2013.01); *B29L 2031/778* (2013.01)

(58) Field of Classification Search
None
See application file for complete search history.

(56) References Cited

U.S. PATENT DOCUMENTS

| | | |
|---|---|---|
| 2,392,734 A | 1/1946 | Haberstump |
| 2,464,514 A | 3/1949 | Kaufmann |
| (Continued) | | |

*Primary Examiner* — Edmun H Lee
(74) *Attorney, Agent, or Firm* — Womble Bond Dickinson (US) LLP

(57) ABSTRACT

Methods of joining members, forming molded portions with members, securing inserts with members, and joined members, such as for a frame or a frame for a fenestration unit, formed thereby, are disclosed. One embodiment of the method includes placing a first member with a first cavity in a joining position, placing a second member proximate the first cavity of the first member in the joining position, injecting a resin into the first cavity, allowing the resin to solidify at least partially to join the first member and second member to form a joined member, and removing the joined member from the joining position. Optionally, the joined member can be formed in a fixture, can include molded portions formed by the resin, and/or can include inserts held in place by the resin. Further, members without cavities can form a cavity that can receive the resin.

3 Claims, 45 Drawing Sheets

Related U.S. Application Data continuation of application No. 12/165,938, filed on Jul. 1, 2008, now Pat. No. 8,652,382.

(56) References Cited

U.S. PATENT DOCUMENTS

| | | | |
|---|---|---|---|
| 3,820,298 A | | 6/1974 | Kirsch |
| 3,885,371 A | | 5/1975 | Oakes |
| 3,893,777 A | | 7/1975 | Jones |
| 3,949,526 A | | 4/1976 | Sherlock et al. |
| 3,968,561 A | | 7/1976 | Oakes et al. |
| 4,261,947 A | | 4/1981 | Ogi |
| 4,630,959 A | * | 12/1986 | Glaser .................. B29C 66/022 264/263 |
| 4,720,951 A | | 1/1988 | Thorn et al. |
| 5,069,849 A | | 12/1991 | Wain |
| 5,244,876 A | | 9/1993 | Preisler et al. |
| 6,073,412 A | | 6/2000 | Verch |
| 6,134,857 A | | 10/2000 | Hope |
| 7,670,527 B2 | | 3/2010 | Malis |
| 7,708,923 B1 | | 5/2010 | Helicke et al. |
| 2003/0006524 A1 | | 1/2003 | Reynolds |

\* cited by examiner

METHODS OF JOINING

CROSS-REFERENCE TO RELATED APPLICATION

This is a divisional of U.S. patent application Ser. No. 14/150,011 filed on Jan. 8, 2014, now U.S. Pat. No. 9,649,795, which in turn is a continuation of U.S. patent application Ser. No. 12/165,938, filed Jul. 1, 2008, now U.S. Pat. No. 8,652,382.

INCORPORATION BY REFERENCE

The disclosures of U.S. Pat. Nos. 8,652,392 and 9,649,795 are hereby incorporated by reference for all purposes as if presented herein in their entireties.

TECHNICAL FIELD

The present invention relates generally to methods of joining members together, methods of joining an insert(s) to members, methods of forming molded portion to members, and/or apparatus formed from these methods. The apparatus and/or joined members can form, for example, a rigid frame that surrounds glass window panes or panels in windows and doors. The molded portions, for example, can form functional pieces affixed to members. The insert(s) can be secured to a member and can include, for example, pins, springs, parts, and other components.

BACKGROUND

Window sashes, door panels, and window and door frames often are constructed from several elongated members, or "lineals," such as, for example, members that surround panes or panels of glass, wood, metal(s), plastic(s), insect screens, etc. Horizontal lineals are commonly referred to as rails, while vertical lineals are commonly referred to as stiles. Although rails and stiles can be made of wood, windows and doors constructed from solid wood can be expensive and require special maintenance and care. Materials, such as plastics, vinyl and composites of wood and resin, compare favorably with the aesthetic beauty of solid wood while offering benefits such as economical pricing, reduced maintenance, and easy installation.

The benefits and relatively low maintenance required for plastics, vinyl, or composite materials make such materials an attractive choice for rails and stiles and other window sash, door panel, or window and door frame components. When forming rails and stiles, these materials typically are extruded into an elongated member (which could be a lineal member) having a cross-section adapted to receive glass panes or solid panels formed from other materials. The rails and stiles are cut to length and fabricated according to the dimensions of the window or door, and are then assembled typically by joining the rails and stiles together at their ends with, for example, mitered corner joints, end butt joints, or mortise and tenon corner joints. As a result of the extrusion process, the rails and stiles typically have an internal cavity. Members with cavities, such as extruded window and door parts with cavities extending the entire length thereof, generally consume less material and are lighter in weight than solid parts having equivalent dimensions. However, forming corner joints between rails and stiles with internal cavities that have the requisite strength, structural integrity, and weather resistance while maintaining a clean aesthetic look is difficult. Although it is known to join the rails and stiles together at their ends with internal inserts, such as complex corner keys, or by hot plate welding or sonic welding, these techniques can exhibit problems and shortcomings. In particular, forming a sufficiently robust attachment between internal inserts such as corner keys and members with cavities can be difficult, especially when the external appearance of the structural members is critical.

Parts used to join members also can require large inventories of similar, but not equivalent, items, such as corner keys for example. Corner keys are used in several situations, including situations where different members are to be joined. Often these different members have different internal cross sectional profiles, with each profile typically requiring a custom shaped corner key, leading to large inventories of corner keys and potential confusion as to which corner key to use for a particular member. This situation can be further complicated by the occasional need to join dissimilar members, for which an appropriate corner key may never have been made, or can be further multiplied by the need to join members at different angles.

SUMMARY

In one embodiment, a method of joining a first member with a first cavity and a second member is disclosed. The method includes placing the first member in a joining position, placing the second member proximate the first cavity of the first member in the joining position, injecting a resin into the first cavity of the first member, allowing the resin to solidify at least partially to join the first member and the second member to form a joined member, and removing the joined member from the joining position. Optionally, the second member can include a first cavity, the first cavity of the second member can be placed proximate the first cavity of the first member to form a joint cavity, and the resin from the first cavity can flow into the first cavity of the second member during the step of injecting. As a further option, an injection port can be formed in either the first member or the second member, in both the first member and the second member, or at an intersection of the first member and the second member. The injection port is generally in flow communication with the cavity in, or formed by, the member(s). Further still, a first flow barrier can be inserted in the first cavity of the first member to limit the volume of resin injected. Also, a second flow barrier can be inserted in the first cavity of the second member to limit the volume of resin injected. Optionally still, the first cavity of the first member and the first cavity of the second member can extend the length of the first member and second member, respectively. The first member and the second member can be lineal members. Further still, the first cavity of the first member can be at a first end of the first member, the second member can include a first cavity at a first end, and, when the first end of the first member is placed in the joining position and first end of the second member is placed in the joining position, a joint cavity can be formed by the first cavity of the first member and the first cavity of the second member. Further, a first flow barrier can be inserted proximate the first end of the first member and a second flow barrier can be inserted proximate the first end of the second member. Further still, a first leg of an L-shaped insert can be inserted into the first cavity of the first member and a second leg of the L-shaped insert can be inserted into the first cavity of the second member. Also, the second member can extend at least partially into the first cavity of the first member or the second member can be arranged to not extend into the first cavity of the first member. The method can form a polygonal frame structure that includes more than two members, such as, for example, a rectangle, a fenestration unit, or a window sash, door panel, window frame, door frame, insect screen, trim, or mulling elements or systems. The resin used in the method can be a curable material, which can optionally include a filler. The filler can be, for example, fumed silica, potter's beads, walnut shells, talc, fly ash, boiler ash, rice hulls, milled glass, wollastonite, or calcium carbonate. Further, the resin can be a thermoset or a two-part polyurethane. The resin can also be a non-curable material, which can optionally include a filler. The filler can be, for example, fumed silica, potter's beads, walnut shells, talc, fly ash, boiler ash, rice hulls, milled glass, wollastonite, or calcium carbonate. Further, the resin can be a thermoplastic. Additionally, the first end of the first member and the first end of the second member can be oriented generally proximate when the first member and the second member are positioned in the joining position. Optionally, the first end of the first member and the first end of the second member can be oriented generally downward when the first member and the second member are positioned in the joining position. Optionally still, the first end of the first member and the first end of the second member can be oriented generally horizontally when the first member and the second member are positioned in the joining position. As a further option, prior to injecting the resin, the method can include orienting a belt clamp around an outer periphery defined by the joined member(s) and at least a third member and tightening the belt clamp to apply a compressive force upon the outer periphery to hold the joined member(s) and the at least third member securely while the resin solidifies.

In yet another embodiment, a method includes joining a first member with a first cavity and a second member. The method includes placing the first member in a fixture, placing the second member proximate the first cavity of the first member in the fixture, injecting a resin into the first cavity of the first member, allowing the resin to solidify at least partially to join the first member and the second member to form a joined member, and removing the joined member from the fixture. Optionally, the second member can include a first cavity, the first cavity of the second member can be placed proximate the first cavity of the first member to form a joint cavity, and the resin from the first cavity can flow into the first cavity of the second member during the step of injecting. Optionally still, an injection port can be formed in either the first member or the second member, in both the first member and the second member, or at an intersection of the first member and the second member. The injection port is generally in flow communication with the cavity in, or formed by, the member. Further still, a first flow barrier can be inserted in the first cavity of the first member to limit the volume of resin injected. Also, a second flow barrier can be inserted in the first cavity of the second member to limit the volume of resin injected. As a further option, the first cavity of the first member and the first cavity of the second member can extend the length of the first member and second member, respectively. The first member and the second member can be lineal members. Further still, the first cavity of the first member can be at a first end of the first member, the second member can include a first cavity at a first end, and, when the first end of the first member is placed in the joining position and the first end of the second member is placed in the joining position, a joint cavity can be formed by the first cavity of the first member and the first cavity of the second member. Further, a first flow barrier can be inserted proximate the first end of the first member and a second flow barrier can be inserted proximate the first end of the second member. Further still, a first leg of an L-shaped insert can be inserted into the first cavity of the first member and a second leg of the L-shaped insert can be inserted into the first cavity of the second member. Also, the second member can extend at least partially into the first cavity of the first member or the second member can be arranged to not extend into the first cavity of the first member. The method can form a polygonal frame structure that includes more than two members, such as, for example, a rectangle, a fenestration unit, or a window sash, door panel, window frame, door frame, insect screen, trim, or mulling elements or systems. The resin used in the method can be a curable material, which can optionally include a filler. The filler can be, for example, fumed silica, potter's beads, walnut shells, talc, fly ash, boiler ash, rice hulls, milled glass, wollastonite, or calcium carbonate. Further, the resin can be a thermoset or a two-part polyurethane. The resin can also be a non-curable material, which can optionally include a filler. The filler can be, for example, fumed silica, potter's beads, walnut shells, talc, fly ash, boiler ash, rice hulls, milled glass, wollastonite, or calcium carbonate. Further, the resin can be a thermoplastic. Additionally, the first end of the first member and the first end of the second member can be oriented generally proximate when the first member and the second member are positioned in the joining position. Optionally, the first end of the first member and the first end of the second member can be oriented generally downward when the first member and the second member are positioned in the joining position. Optionally still, the first end of the first member and the first end of the second member can be oriented generally horizontally when the first member and the second member are positioned in the joining position. As a further option, prior to injecting the resin, the method can include orienting a belt clamp around an outer periphery defined by the joined member(s) and at least a third member and tightening the belt clamp to apply a compressive force upon the outer periphery to hold the joined member(s) and the at least third member securely while the resin solidifies. Further, the fixture can include a cover portion capable of blocking the resin from flowing beyond an external surface of the first member.

In yet another embodiment, a method includes molding a feature to a first member with the first member having a first cavity. The method includes placing the first member in a joining position, placing the mold proximate the first cavity of the first member, injecting a resin into the first cavity of the first member and the mold, allowing the resin to solidify at least partially to join the first member and the mold to form a member with a molded feature, and removing the member with molded feature from the joining position. Optionally, a second member with a first cavity can be provided, with the first cavity of the second member placed proximate the first cavity of the first member prior to placing the mold proximate the first cavity of the first member. Here, the first cavity of the first member and the first cavity of the second member form a joint cavity. Optionally, the resin from the first cavity can flow into the first cavity of the second member during the step of injecting. Optionally still, an injection port can be formed in either the first member or the second member, in both the first member and the second member, or at an intersection of the first member and the second member. The injection port is generally in flow communication with the cavity in, or formed by, the member. Further still, a first flow barrier or plug can be inserted in the first cavity of the first member to limit the volume of resin injected. Also, a second flow barrier or plug can be inserted in the first cavity of the second member to limit the volume of resin injected. As a further option, the first cavity of the first member and the first cavity of the second member can extend the length of the first member and second member, respectively. The first member and the second member can be lineal members. Further still, the first cavity of the first member can be at a first end of the first member, the second member can include a first cavity at a first end, and, when the first end of the first member is placed in the joining position and the first end of the second member is placed in the joining position, a joint cavity can be formed by the first cavity of the first member and the first cavity of the second member. Further, a first flow barrier can be inserted proximate the first end of the first member and a second flow barrier can be inserted proximate the first end of the second member. Further still, a first leg of an L-shaped insert can be inserted into the first cavity of the first member and a second leg of the L-shaped insert can be inserted into the first cavity of the second member. Also, the second member can extend at least partially into the first cavity of the first member or the second member can be arranged to not extend into the first cavity of the first member. The method can form a polygonal frame structure that includes more than two members, such as, for example, a rectangle, a fenestration unit, or a window sash, door panel, window frame, door frame, insect screen, trim, or mulling elements or systems. The resin used in the method can be a curable material, which can optionally include a filler. The filler can be, for example, fumed silica, potter's beads, walnut shells, talc, fly ash, boiler ash, rice hulls, milled glass, wollastonite, or calcium carbonate. Further, the resin can be a thermoset or a two-part polyurethane. The resin can also be a non-curable material, which can optionally include a filler. The filler can be, for example, fumed silica, potter's beads, walnut shells, talc, fly ash, boiler ash, rice hulls, milled glass, wollastonite, or calcium carbonate. Further, the resin can be a thermoplastic. Additionally, the first end of the first member and the first end of the second member can be oriented generally proximate when the first member and the second member are positioned in the joining position. Optionally, the first end of the first member and the first end of the second member can be oriented generally downward when the first member and the second member are positioned in the joining position. Optionally still, the first end of the first member and the first end of the second member can be oriented generally horizontally when the first member and the second member are positioned in the joining position. As a further option, prior to injecting the resin, the method can include orienting a belt clamp around an outer periphery defined by the joined member(s) and at least a third member and tightening the belt clamp to apply a compressive force upon the outer periphery to hold the joined member(s) and the at least third member securely while the resin solidifies. Further, the fixture can include a cover portion capable of blocking the resin from flowing beyond an external surface of the first member. Further, the joining position can be in a fixture and the mold can be positioned proximate the fixture. Also, an internal or external feature can be formed from the resin in the mold and the internal or external feature can be internal or exterior to one or both of the member(s). Optionally still, an end cap can be formed from the resin. To form the end cap, the method can provide that the first cavity of the first member can be at a first end of the first member and that the first cavity of the second member can be at a first end of the second member, the mold can be a fixture and the first end of the first member and the first end of the second member can be placed in the fixture in the joining position with the first end of the first member spaced at least partially from the fixture by a space. The space can be filled by the resin to form an end cap at least partially conforming to the fixture.

In yet another embodiment, a method includes joining a first member and an insert with the first member having a first cavity. The method includes placing the first member in a joining position, placing the insert at least partially in the first cavity of the first member, injecting a resin into the first cavity of the first member, allowing the resin to solidify at least partially to join the first member and the insert to form a member with attached insert, and removing the member with attached insert from the joining position. Optionally, the method can include a second member with a first cavity, with the first cavity of the second member placed proximate the first cavity of the first member prior to placing the insert at least partially in the first cavity of the first member or the first cavity of the second member. The first cavity of the first member and the first cavity of the second member can form a joint cavity. Optionally, an injection port can be formed in either the first member or the second member, in both the first member and the second member, or at an intersection of the first member and the second member. The injection port is generally in flow communication with the cavity in, or formed by, the member. Further still, a first flow barrier can be inserted in the first cavity of the first member to limit the volume of resin injected. Also, a second flow barrier can be inserted in the first cavity of the second member to limit the volume of resin injected. As a further option, the first cavity of the first member and the first cavity of the second member can extend the length of the first member and second member, respectively. The first member and the second member can be lineal members. Further still, the first cavity of the first member can be at a first end of the first member, the second member can include a first cavity at a first end, and, when the first end of the first member is placed in the joining position and the first end of the second member is placed in the joining position, a joint cavity can be formed by the first cavity of the first member and the first cavity of the second member. Further, a first flow barrier can be inserted proximate the first end of the first member and a second flow barrier can be inserted proximate the first end of the second member. Further still, a first leg of an L-shaped insert can be inserted into the first cavity of the first member and a second leg of the L-shaped insert can be inserted into the first cavity of the second member. Also, the second member can extend at least partially into the first cavity of the first member or the second member can be arranged to not extend into the first cavity of the first member. The method can form a polygonal frame structure that includes more than two members, such as, for example, a rectangle, a fenestration unit, or a window sash, door panel, window frame, door frame, insect screen, trim, or mulling elements or systems. The resin used in the method can be a curable material, which can optionally include a filler. The filler can be, for example, fumed silica, potter's beads, walnut shells, talc, fly ash, boiler ash, rice hulls, milled glass, wollastonite, or calcium carbonate. Further, the resin can be a thermoset or a two-part polyurethane. The resin can also be a non-curable material, which can optionally include a filler. The filler can be, for example, fumed silica, potter's beads, walnut shells, talc, fly ash, boiler ash, rice hulls, milled glass, wollastonite, or calcium carbonate. Further, the resin can be a thermoplastic. Additionally, the first end of the first member and the first end of the second member can be oriented generally proximate when the first member and the second member are positioned in the joining position. Optionally, the first end of the first member and the first end of the second member can be oriented generally downward when the first member and the second member are positioned in the joining position. Optionally still, the first end of the first member and the first end of the second member can be oriented generally horizontally when the first member and the second member are positioned in the joining position. As a further option, prior to injecting the resin, the method can include orienting a belt clamp around an outer periphery defined by the joined member(s) and at least a third member and tightening the belt clamp to apply a compressive force upon the outer periphery to hold the joined member(s) and the at least third member securely while the resin solidifies. Further, the fixture can include a cover portion capable of blocking the resin from flowing beyond an external surface of the first member. Further, the insert can protrude from an external surface of the first member, the insert can be adapted to receive a fastening device or the insert can be adapted to receive a threaded fastener.

In another embodiment, a method includes joining a first member and a second member. The method includes placing the first member in a joining position, placing the second member proximate the first member in the joining position forming a cavity between the first member and the second member, injecting a resin into the cavity to form a joined member, and removing the joined member from the joining position after the resin has solidified at least partially. Optionally, an injection port can be formed in either the first member or the second member, in both the first member and the second member, or at an intersection of the first member and the second member. The injection port is generally in flow communication with the cavity. Further still, a first flow barrier can be inserted in the cavity to limit the volume of resin injected. The first member and the second member can be lineal members. Also, the cavity can be formed at a first end of the first member and at a first end of the second member. Further, a first leg of an L-shaped insert can be inserted into the first cavity of the first member and a second leg of the L-shaped insert can be inserted into the first cavity of the second member. Further still, the second member can extend at least partially into the first cavity of the first member or the second member can be arranged to not extend into the first cavity of the first member. The method can form a polygonal frame structure that includes more than two members, such as, for example, a rectangle, a fenestration unit, or a window sash, door panel, window frame, door frame, insect screen, trim, or mulling elements or systems. The resin used in the method can be a curable material, which can optionally include a filler. The filler can be, for example, fumed silica, potter's beads, walnut shells, talc, fly ash, boiler ash, rice hulls, milled glass, wollastonite, or calcium carbonate. Further, the resin can be a thermoset or a two-part polyurethane. The resin can also be a non-curable material, which can optionally include a filler. The filler can be, for example, fumed silica, potter's beads, walnut shells, talc, fly ash, boiler ash, rice hulls, milled glass, wollastonite, or calcium carbonate. Further, the resin can be a thermoplastic. Additionally, the first end of the first member and the first end of the second member can be oriented generally proximate when the first member and the second member are positioned in the joining position. Optionally, the first end of the first member and the first end of the second member can be oriented generally downward when the first member and the second member are positioned in the joining position. Optionally still, the first end of the first member and the first end of the second member can be oriented generally horizontally when the first member and the second member are positioned in the joining position. As a further option, prior to injecting the resin, the method can include orienting a belt clamp around an outer periphery defined by the joined member(s) and at least a third member and tightening the belt clamp to apply a compressive force upon the outer periphery to hold the joined member(s) and the at least third member securely while the resin solidifies. Further, the fixture can include a cover portion capable of blocking the resin from flowing beyond an external surface of the first member.

In another embodiment, a method of forming a frame from a plurality of elongated members is disclosed. The members are arranged in an end-to-end engagement to form corner joints therebetween. The members form a cavity therebetween. The corner joints can be filled singly, can be filled simultaneously, or more than one joint can be filled at a time. The corner joints allow open communication between the internal cavities of adjoining pairs of elongated members. The method can include the steps of intermittently rotating the frame such that each corner joint is placed in a corner joint filling orientation for a period of time between intermittent rotations. When a joint is in this orientation, the internal cavities are filled with a resin in the vicinity of the corner joint. The resin is allowed to solidify, at least partially, during the time between intermittent rotations and while the joint is in the filling orientation. The corner joint filling orientation can have the members in any filling position, from horizontal, to an orientation with the corner substantially vertical with respect to the members, to any angle between horizontal and vertical, with the members angularly offset—such with an adjoined pair of members oriented approximately an equal 45-degrees from vertical, or to any combination of angles therebetween.

Another embodiment is disclosed that includes a method of forming a frame from a plurality of elongated members each having an internal cavity and engaging each other in an end-to-end engagement and where adjoining members together define a corner joint between them that allows open communication between the internal cavities. The method comprises steps of placing the members in a desired arrangement to form at least one corner joint, holding the arrangement so that the elongated members continuously engage each other at the corner joint, intermittently rotating the arrangement so that each corner joint is successively placed in the corner joint filling orientation for a period of time, introducing a resin into the communicating internal cavities in the vicinity of the corner joint, and allowing the resin to solidify during said period of time when the arrangement is not intermittently rotating.

The resin generally is a synthetic resin, though a natural resin or a blend of natural resin(s) and synthetic resin(s) could be used. Generally, the resins include fluid materials that are capable of being injected into a joint cavity formed by at least two members. The resin can be a curable resin or a non-curable resin. The non-curable resin can be a thermoplastic that can be heated, melted, shaped, or treated as a thermoplastic with the properties thereof. The curable resin can be a thermoset, such as a thermoset that undergoes a chemical reaction during curing. An example of a thermoset curable resin is a two-part polyurethane. These resins subsequently react to join inserts adhering to internal surfaces of structural members with cavities. The resin can also include additional resin(s) and/or solid filler materials.

The present invention provides materials that fill predefined spaces of members with cavities and generally includes a method of forming blocks or injecting material(s) that fill a space within a cavity of a member, that fill cavities between two or more members, that surround at least partially an insert, that form an internal or external molded feature, that fill a cavity formed between two members where a cavity is formed between two members when joined, or members joined together. Further, a flow barrier for confining a liquid material to a particular volume within the member can be provided. Alternatively, the resin can be thixotropic and not require a confining means once injected. The resin can be any resin, but generally is a curable resin that reacts to form a solid mass of resin. Upon solidifying, the resin generally forms both a structural bond and a watertight seal with the internal walls of the member(s). The mass can be used for fastening other members to the members. For example, in one embodiment detailed herein, self threading fasteners can be driven through the walls of the members into the mass. In other embodiments, the mass can be provided with encapsulated inserts for receiving fasteners such as threaded bolts, snap fasteners, expanding fasteners, and the like. In yet other embodiments, openings can be provided in walls of the members and molds can be provided in communication with the predefined internal resin cavity so that the member can be provided with external molded features formed simultaneously with the formation of the internal block.

Another aspect of joining members with cavities is the positioning of the members during injection and solidifying, which can be accomplished by suitable fixturing. Because the resin is a flowable material prior to solidifying, the final dimensions of the assembled structure can be determined almost entirely by the fixturing system, without regard to dimensional tolerances that might otherwise require consideration. Several variations of fixturing are possible. For example, a whole unit fixture is a fixture that holds all of the members to be joined in the precise positions that will provide the desired final dimensions of the complete unit. The resin is then injected into the joints and allowed to solidify, thereby producing a finished unit. Whole unit fixturing has the advantage of producing a completed unit in a single setup, but has the disadvantage of being less adaptable to producing a range of units of different dimensions or configurations. In an alternative exemplary fixturing system termed sequential fixturing, the fixture only holds the members forming a single joint of the structure. The two members are held in the fixture, the resin is injected and allowed to solidify, and the completed part is removed from the fixture. If a structure has more than one joint, the completed part is considered a subunit that itself can be used as one of the members forming a subsequent joint. Sequential fixturing has the advantage of improved flexibility for producing a variety of units of different dimensions, but has the disadvantage of requiring additional steps and time to produce a completed unit.

Fixturing can also serve a useful function in preventing leakage from the joint during injection. Fixtures can be designed, for example, that enclose the outside surfaces of the members being joined, in the joint area, so as to seal against any leakage that might occur. These fixtures are termed closed fixtures. Closed fixtures have the advantage that the resin need not be thixotropic. On the other hand, they suffer the disadvantages of being complex, of being less adaptable to differences in configuration of the members being joined, and of providing a visible line of resin that has solidified that may not match the color of the joined members. Alternatively, fixtures that do not provide sealing of joint areas against leakage, but rather depend on the thixotropic or other flow resisting properties of the resin, are termed open fixtures. Fixtures can be open or closed, whole unit or sequential, or any combination of these.

Fixtures can also be partially closed, wherein, for example, portions of the joint in which a smooth, flush surface is critical can be enclosed by the fixture to form a smooth surface, while portions of the fixture in other, less critical areas, can be left open, in order, for example, to simplify construction of the fixture. Flush surfaces can be required, for example, when a gasket, weatherstrip, or other sealing member passes over a joint. If the joint forms a slight depression, or a slight bump, the sealing member may fail to seal completely, and tend to draw water through the unsealed area(s). The use of a closed fixture in such an area, along with a sufficient local joint gap provided to allow a slight leakage of resin that then fills the gap and is formed into a smooth surface by the closed mold, can reduce this tendency.

In general, injection as described herein refers to any means for conveying resin into a joint cavity, including, for example, pumping through a tube or pouring through a funnel. In the present context, because the viscosities of the injected materials are low, compared with thermoplastics typically used in injection molding, the pressures involved in the injection process need not be significantly above atmospheric, though higher pressures may be useful to increase production rates, to overcome viscosity or gelling effects, or to provide other advantages. Generally, the ability to fill the joint cavities by injection at lower pressures provides significant advantages over higher pressure injection methods such as, for example, injection of hot melt adhesives or other molten materials.

The invention also details a joined member formed by a method of joining. The method including providing a first member and a second member, the first member having a first cavity. The first member being placed in a joining position and the second member being placed proximate the first cavity of the first member in the joining position. A resin is injected into the first cavity of the first member, the resin is allowed to solidify at least partially to join the first member and the second member to form the joined member. Optionally, the method can include removing the joined member from the joining position. Further, the joined member can be a part of a fenestration unit.

The invention also details a fenestration unit that includes a frame or sash formed, at least in part, by a joined member that includes a first member and a second member joined by a method of joining. The method including providing a first member and a second member, the first member having a first cavity. The first member being placed in a joining position and the second member being placed proximate the first cavity of the first member in the joining position. A resin is injected into the first cavity of the first member, the resin is allowed to solidify at least partially to join the first member and the second member to form the joined member. Optionally, the method can include removing the joined member from the joining position.

BRIEF DESCRIPTION OF THE DRAWINGS

Having described some aspects of the invention in general terms, reference will now be made to the accompanying figures, which are not necessarily drawn to scale.

DETAILED DESCRIPTION

Referring now in greater detail to the figures, in which like numerals refer to like parts throughout the several views, a first embodiment applies to manufacturing window sashes, window frames, door panels, door frames, or other similar articles where a rigid frame is formed from separate elongated members. In another aspect, a method of assembling windows, doors, or other items that employ a unitary geometric frame formed by assembling discrete elongated members is disclosed. In the interest of clarity and ease of description, the method will be described and shown within the context of a window sash frame.

Figure 1:
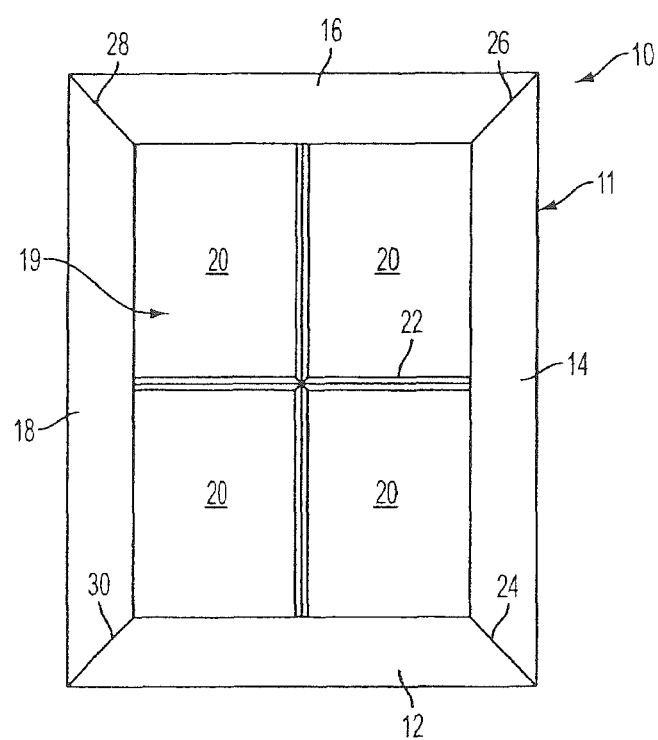
FIG. 1 is a front elevation view of a window sash having a frame according to a first embodiment.

FIG. 1 shows a window sash 10 with a plurality of elongated frame members including a first horizontal rail 12, a second horizontal rail 16, a first vertical stile 14, and a second vertical stile 18. The first and second horizontal rails and the first and second vertical stiles together form a structural frame 11 that surrounds a transparent window pane 19. Window pane 19 is shown comprising four window lites 20 and a grille 22, but it should be understood that the window pane 19 can be configured as a single lite or numerous lites, with or without a grille, or a panel formed from glass, solid wood, plastic, metal, or other material, or blend. The rails and stiles are shown arranged in an end-to-end relationship such that each end of rail 12 engages a lower end of each adjacent stile 14 and 18 to form mitered corner joints 24 and 30, while each end of rail 16 engages an upper end of each stiles 14 and 18 to form mitered corner joints 26 and 28.

The ends of each rail and stile shown in FIG. 1 are mitered at an angle of about 45° and, once assembled, corner joints 24, 26, 28, and 30 define approximately 900 angles. In this way, the rails and stiles join together so that window sash 10 and frame 11 have a generally rectangular shape. However, the rails and stiles can be mitered at angles other than 45° and used in connection with additional elongated members to form windows and sashes that can have any other suitable geometry, such as, for example, triangular, pentagonal, or hexagonal. Further, in lieu of mitered angles, other types of connections can be utilized, such as mortise and tenon joints, butt joints, etc.

Figure 2:
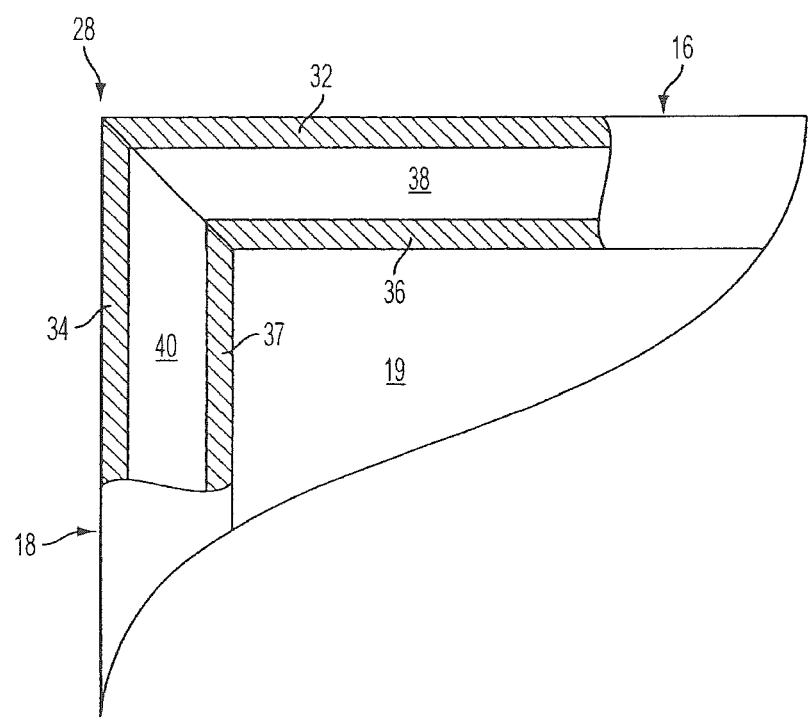
FIG. 2 is a partial cut-away view of the window sash frame of FIG. 1.

FIG. 2 depicts a close-up, partially-sectioned view of corner joint 28 formed by rail 16 and stile 18. Rail 16 and stile 18 are representative of all elongated members of frame 11 (FIG. 1) in that they each have a respective external wall 32 and 34 and a respective internal wall 36 and 37. In one preferred embodiment, the rails and stiles are made of an extruded wood/resin composite that has been cut to length according to the dimensional requirements of the particular object to be formed by joining. As a result of the extrusion process, rail 16 preferably has an internal cavity 38 defined, at least in part, by internal wall 36 and external wall 32, while stile 18 has a similar internal cavity 40 defined, at least in part, by internal wall 37 and external wall 34. In one embodiment, rail 16 and stile 18 have generally square cross-sections; however, the cross-sections can be any suitable shape, such as, for example, rectangular, triangular or hexagonal. Rails and stiles, such as, for example, of window frames, window sashes, door panels, and door frames, typically have complex profiles that form glazing beds or notches and that mimic certain architectural details of traditional wooden windows or doors. Simple shapes are illustrated herein for clarity.

Rail 16 and stile 18 are shown mitered at their adjoining ends at about a 45° angle, with internal cavities 38 and 40 communicating with each other at corner joint 28. The adjoining ends of adjacent members need not be mitered to benefit from the advantages of the present joining methods. For example, butt joints can be employed, where both the rail and the stile are cut such that their ends are generally square, so long as the features of the elongated members form a sufficient joining cavity.

Figure 3:
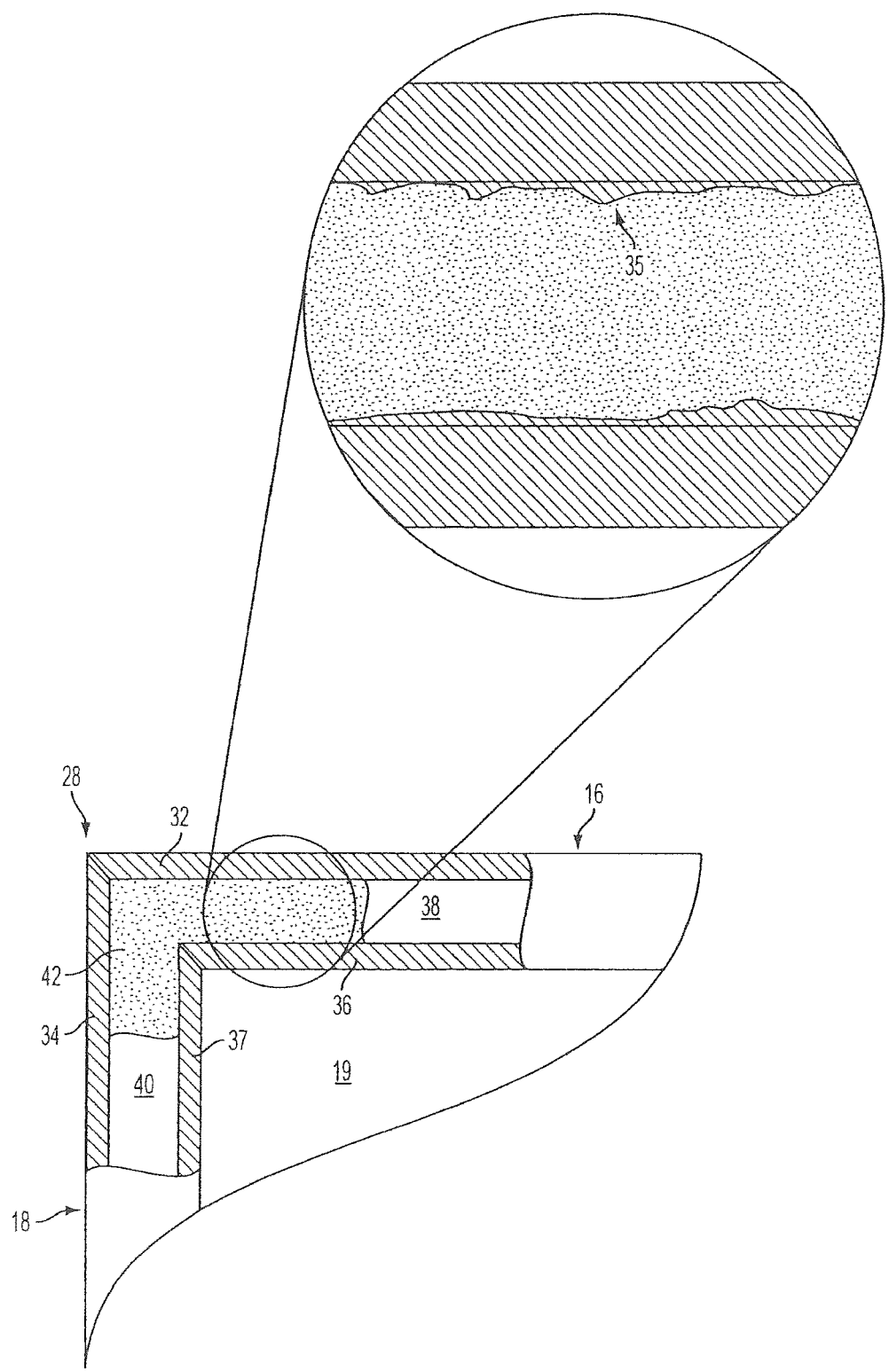
FIG. 3 is a partial cut-away view of the window sash frame with an injected resin block of FIG. 1.

With reference to FIG. 3, rail 16 and stile 18 are shown in a similar arrangement depicted in FIG. 2. A resin 42 has been introduced, such as by injection, into the respective internal cavities 38 and 40 of rail 16 and stile 18 in the vicinity of corner joint 28. Filling the internal cavities of the rail 16 and the stile 18 in the vicinity of the corner joint with resin increases the strength and structural integrity of the joint, because the rail and stile are joined fast and securely together as resin 42 solidifies within the internal cavities. When the internal cavities of the rail and stile are filled simultaneously, the resin generally solidifies and creates a unitary key that rigidly joins the rail and stile together. In a preferred embodiment, resin 42 is a two-part elastomeric polyurethane system such as BAYFLEX XGT-140 from Bayer Corporation of Pittsburgh, Pa., but any other suitable resin, curable material, or joining compound can be substituted for BAYFLEX. Examples of resins available from BAYFLEX include: BAYFLEX XGT-2, BAYFLEX XGT-4, BAYFLEX XGT-16, BAYFLEX XGT-50, BAYFLEX XGT-80, BAYFLEX XGT-100, and BAYFLEX XGT-140.

Adhesion, such as between a resin and the surface it contacts, is typically an important contributor to the overall strength and functionality of a joint formed by the disclosed methods of joining. In the field of adhesion science, the surfaces in contact with an adhesive resin are commonly referred to as "adherands," and this term will be used to described the surface of any component that is intentionally exposed to the resin. Adhesion between a resin and the adherand surfaces generally results from both mechanical and chemical interactions. Chemical bonding is the result of various attractive mechanisms, such as covalent bonding or van der Waals effects, for example, generally acting between the molecules of the resin and the adherand surfaces. Mechanical bonding, comparatively, is the result of resistive mechanisms, such as frictional or interference forces, for example, that arise by contact and stress between the resin and the adherand surfaces. This mechanical bonding is similar to the keying apertures 70 in FIGS. 5, 6, and 7, for example, although typically on a smaller scale. In some applications, a certain amount of surface roughness or texturing of the interior surface of the members can increase the overall strength of the joined members, or an insert joined with a member, of a mold portion formed with/in a member, or of the member itself. An exemplary view of mechanical interlocking is shown in FIG. 3 in a magnified view with the resin and an example surface 35 formed of Fibrex® material. As the resin solidifies, mechanical interlocking occurs along the rough surface texture features of the inner walls of the Fibrex material, increasing the overall mechanical strength of the bond. For exemplary purposes, a section of FIG. 3 has been magnified and somewhat exaggerated for clarity to demonstrate the relative roughness of the Fibrex material inner walls in relation to the Fibrex material wall thickness.

Figure 4:
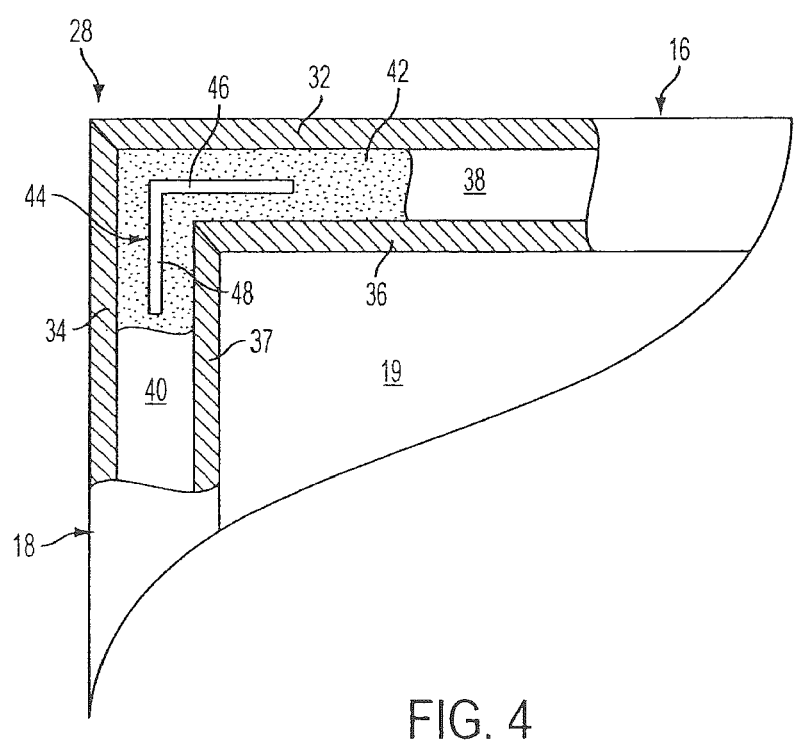
FIG. 4 is a partial cut-away view of a second embodiment with a window sash with an insert.

FIG. 4 shows a cut-away, partially-sectioned view of corner joint 28 formed in accordance with a second embodiment with a window sash with an insert. In this embodiment, a generally L-shaped reinforcing key 44 having a first leg 46 and a second leg 48 is used to strengthen the corner joint. Reinforcing key 44 can be formed of any material suitable for forming substantially rigid structures, such as, for example, steel, aluminum, high-strength structural plastic, carbon composites, or the like. During assembly of frame 11 (FIG. 1), key first leg 46 is inserted into internal cavity 38 and key second leg 48 is inserted into internal cavity 40. When introduced into corner joint 28, resin 42 fills the internal cavities 38 and 40 in the vicinity of corner joint 28 as shown in FIG. 3 above. The resin surrounds and encapsulates reinforcing key 44 within the corner, and as the resin solidifies, as discussed in further detail below, key 44 reinforces and increases the overall structural integrity of corner joint 28. Similar reinforcing keys can be inserted in the same manner in corner joints 24, 26, and 30 (FIG. 1).

Figure 5:
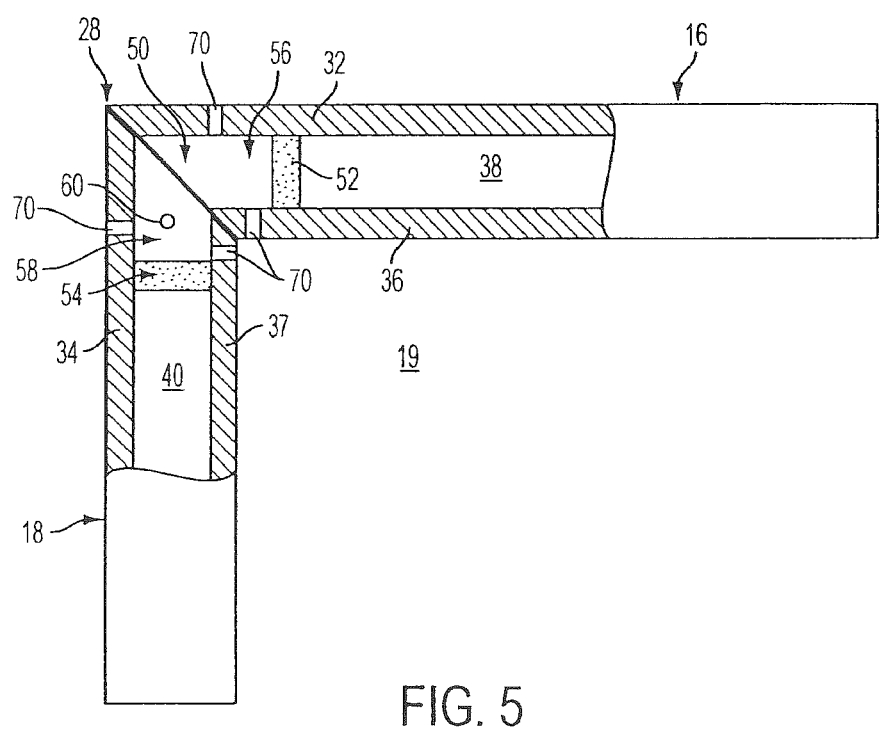
FIG. 5 shows a third embodiment of the present invention with flow barriers and an injection port.

FIG. 5 shows a third embodiment of the present invention with flow barriers and an injection port. In this embodiment, a plug 52 has been inserted into cavity 38 to create a resin cavity 56 and a plug 54 has been inserted into cavity 40 to create a resin cavity 58. A joint cavity 50 comprises resin cavities 56 and 58, which will receive resin as detailed herein. Plugs 52 and 54, which limit the extent of the flow of the resin into the members to the distance needed for acceptable joining of members 16 and 18, can be made from any material, such as a polymeric foam material, for example, polyethylene or polypropylene, or any other suitably flexible and chemical resistant material. Generally, plugs 52 and 54 are die cut from a sheet of suitable foam material, and plugs can be close or snug fitting or can be loosely fit within the cavity(ies). While members 16 and 18 typically have similar cross sections, since the plugs 52 and 54 retard progress of the resin into the cavities 38 and 40, such cavities can have differing cross sections where sufficient communication between members 16 and 18 is provided to allow resin to flow into resin cavities 56 and 58. Also, while the embodiment shown in FIG. 5 joins two members that typically have a substantially constant cross section over their length, members 16 and 18 could be any shape, provided a suitable joint cavity is formed therebetween.

Also shown in FIG. 5, an injection port 60, into and through which resin generally will be injected, is disposed in joint cavity 50. Injection port 60 generally is in fluid communication with joint cavity 50. Although the injection port 60 is shown adjacent cavity 58 in stile 18, injection port 60 can be disposed in either rail 16 or stile 18, can include multiple injection ports, or some or all of the ports can include optional access or closure accessories, such as a valve, check valve, a flap, or the like to prevent backflow. Further, FIG. 5 shows optional mechanical keying apertures 70 that provide mechanical keying to improve pull-out resistance of inserts when the resin flows into apertures 70.

Figure 6:
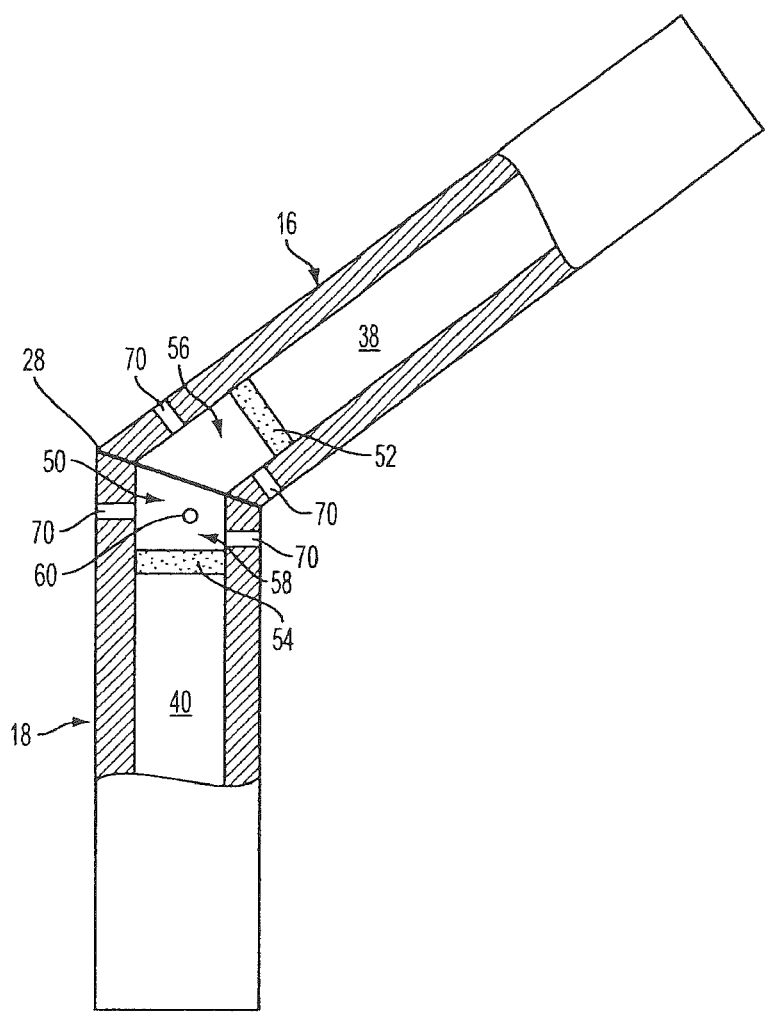
FIG. 6 shows a fourth embodiment of the present invention joining members at angles other than ninety degrees.

Members can also be joined at angles other than 90°, as shown in FIG. 6. Because a resin that is flowable is utilized here in lieu of mechanical joining, members can be joined at any angle by fabricating the end surfaces to be joined at the appropriate angle, without the need to provide different mechanical joining components for each desired joining angle. As shown in FIG. 6, member 16 is disposed at an angle to member 18 to meet at corner joint 28.

Figure 7:
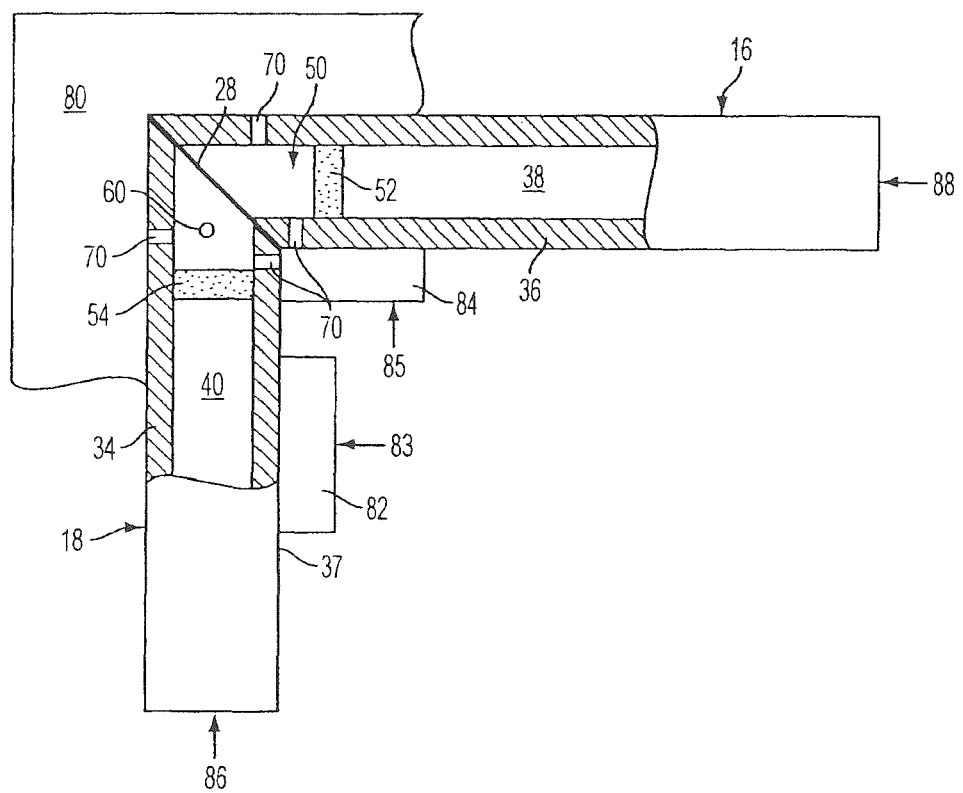
FIG. 7 shows a fixturing system usable to fill the cavities with resin.

FIG. 7 shows one example of a fixturing system that can be used to fill the cavities with resin. Members 16 and 18 are placed in contact with exterior fixture portion 80, and held in place by blocks 82 and 84. Blocks 82 and 84 press members 16 and 18 against portion 80, with forces applied in directions 83 and 85. Members 16 and 18 are further urged into contact by forces 88 and 86, respectively, which are provided by other portions of the fixture, not shown. If keying apertures 70 are provided, fixture portion 80 and blocks 82 and 84 can be used to halt the flow from apertures 70 and can form smooth surfaces on the exterior of members 16 and 18. Alternatively, fixture portion 80 can surround the entire unit being assembled, such as with all structural members being placed in a whole unit fixture. Alternatively still, fixture portion 80 can hold only members 16 and 18, with an assembled sub-unit comprising members 16 and 18 forming a structural member for subsequent forming of a joint with a third member, in a sequential fixturing process, not shown.

After placing members 16 and 18 in the fixture, resin is injected into injection port 60. The amount of resin injected can be determined by a set metering device, can be based upon the volume of joint cavity 50, can be determined by the level of fill observed by the operator, or can be by any other means. Injection port 60 typically is located in an inconspicuous location on one of the members being joined so as not to harm significantly the appearance of the finished unit. Generally, during injection, the members being joined are oriented to locate injection port 60 on the top of the unit to avoid flow back of the resin out of the injection port. Alternatively, as indicated above, a check valve or other apparatus can be inserted in or adjacent injection port 60 to prevent backflow of resin that has been injected.

The interface 28 between members 16 and 18 typically will contain gaps, due generally to unavoidable imperfections, with such gaps possibly allowing resin to leak out, even under relatively low pressures. In one embodiment, the fixtures holding the members in position can be closed fixtures that cover the joint area so that gaps in interface 28 can be filled with resin to prevent leakage of resin. Closed fixtures have the additional advantage of providing a smooth, flush exterior surface in the area of the joint, particularly when the resin is able to fill any gaps.

Mortise and Tenon Joints

Figure 8:
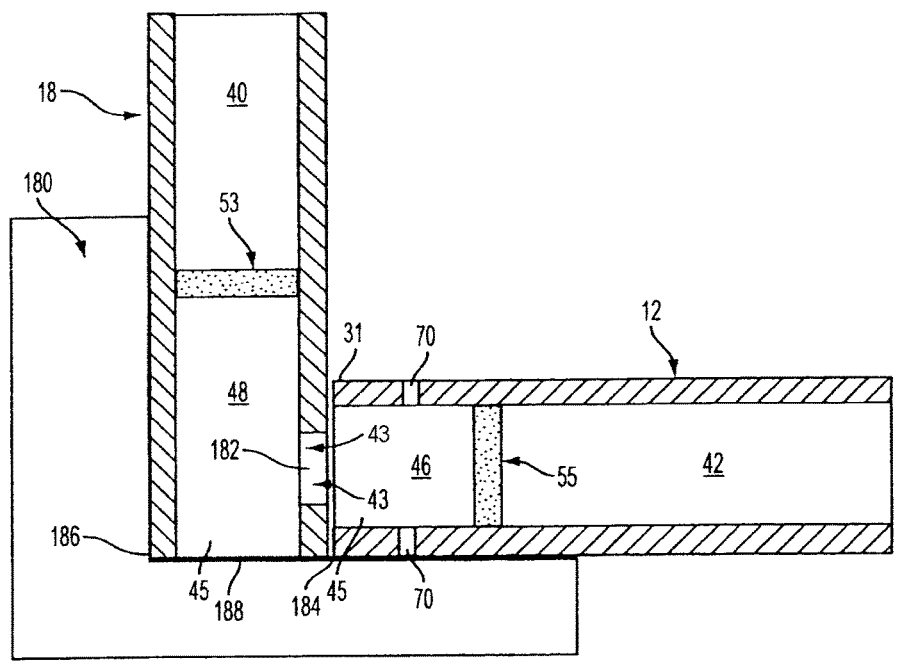
FIG. 8 shows a fifth embodiment similar to mortise and tenon joinery.

The invention is not limited to mitered joints. In a fifth embodiment shown in FIG. 8, member 18 is joined to member 12 in a manner reminiscent of mortise and tenon joints traditionally used in wood joinery. Member 18 is adapted to be joined to member 12 by providing an opening 182 in the side of member 18 facing end 31 of member 12. When member 18 is positioned at and/or across the end of member 12, opening 182 provides communication between first cavity 48 of member 18 and first cavity 46 of member 12. As a result, cavities 46 and 48, plugs 53 and 55, and the portion of fixture 180 that covers end 186 of member 18 cooperate to define joint cavity 45. Opening 182 serves the dual purpose of allowing resin to flow from cavity 46 to cavity 48, such as at flow path 43 in FIG. 8, or from cavity 48 to cavity 46 (the flow path from cavity 48 to cavity 46 is not shown in FIG. 8). The opening 182 also provides, after the resin solidifies at least partially, a joining structure between members 18 and 12, analogous to a tenon in traditional mortise and tenon joints. The size and shape of opening 182 is adapted to serve these two purposes, without excessively weakening member 18 or creating leakage paths for the resin during injection. The strength of the joint can be further enhanced by apertures 70 in member 12, which can fill with resin, thereby providing mechanical keying when the resin solidifies. The joint shown in FIG. 8 is characterized by enhanced strength, due to the large area of resin adhesion to the internal surfaces of members 18 and 12, thereby reducing the likelihood of adhesive failure and reducing localized stresses that might precipitate failure due to wall breakage of members 18 and 12.

Since a portion of fixture 180 is in direct contact with the resin during the injection and solidification process, preferably the resin, once solidified, will not adhere to the portion of fixture 180 that contacts the resin. Accordingly, a portion of fixture 180 can be provided with non-adherent materials, such as fluoropolymers, silicones, or stearates, in specific areas, either during construction of fixture 180 or applying these or other mold release materials to the fixture 180 prior to use. The choices of non-adherent materials are increased in comparison to thermoplastic injection molding since the need to withstand high temperatures and pressures is lessened.

Figure 9:
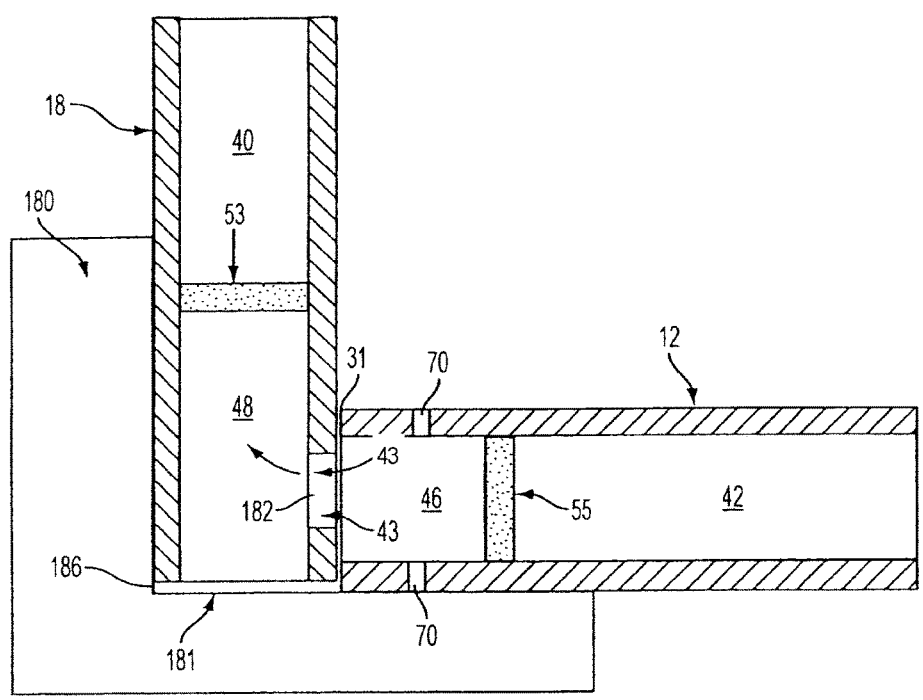
FIG. 9 shows a sixth embodiment with a gap provided as a part of the joint cavity.

In a sixth embodiment shown in FIG. 9, member 18 is moved longitudinally a slight distance away from the surface of fixture 180, to leave gap 181. In this embodiment, fixture 180 is a partially or fully closed fixture that encloses gap 181 to define gap 181 as part of the joint cavity. Upon solidifying after injection of resin, the resin in gap 181 itself becomes an end cap for member 18, thereby concealing the end of member 18.

Figure 10:
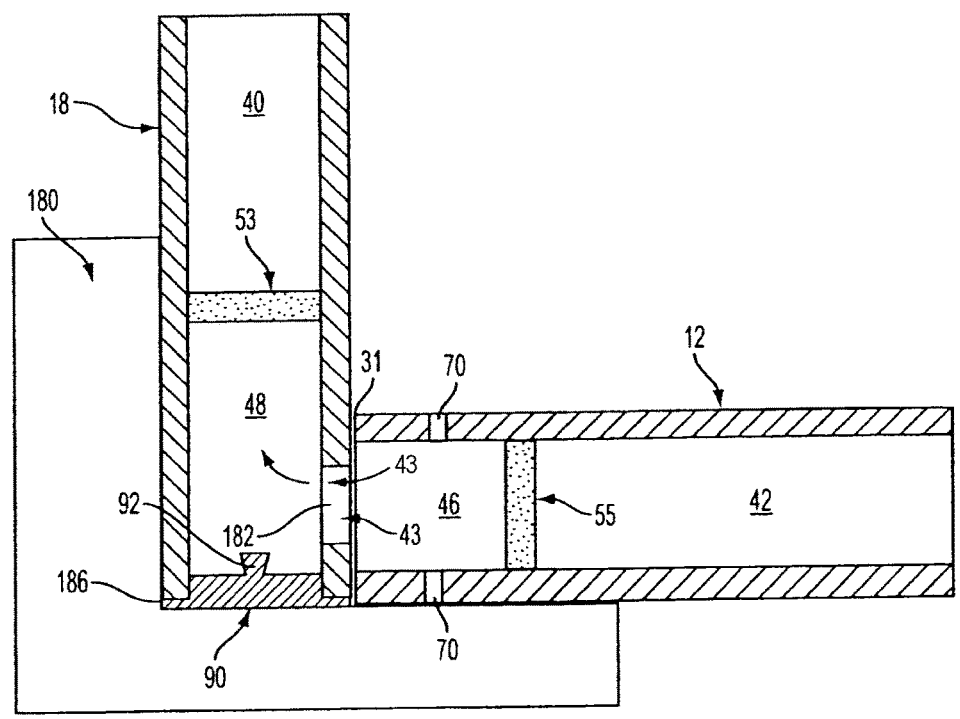
FIG. 10 shows a seventh embodiment with an end cap.

In a seventh embodiment shown in FIG. 10, end 186 of member 18 is covered by an end cap 90 inserted prior to placement in fixture 180. End cap 90 can be press fitted into end 186 or inserted in any manner. End cap 90 can optionally include a keying portion 92 to assist holding end cap 90 in place after injection and solidifying of the resin. Although keying portion 92 is shown in FIG. 10 as a single element, keying portion 92 is not limited to the number, size, or configuration shown, but instead can be formed in any suitable configuration. End cap 90 can be formed by any process.

Figure 11:
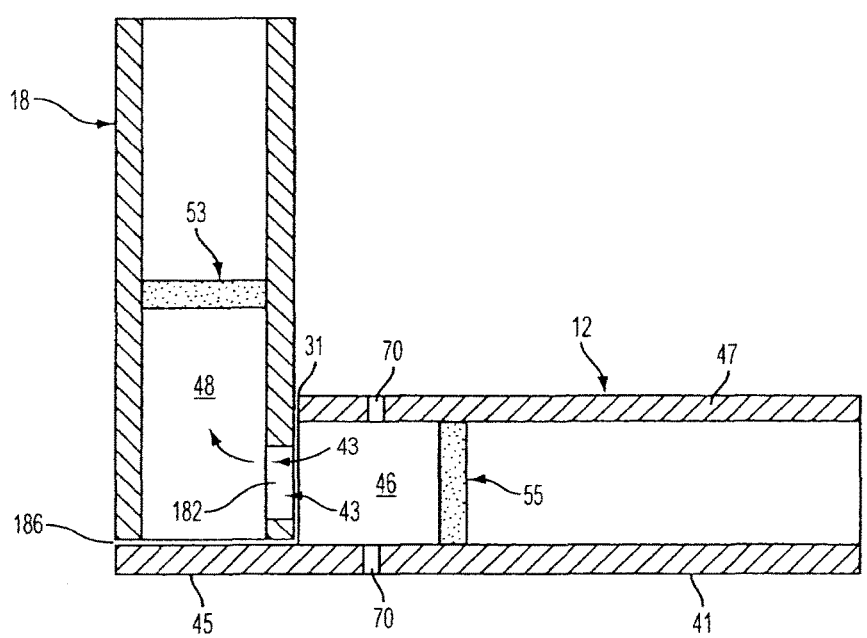
FIG. 11 shows an eighth embodiment with an extended end portion forming the end cap.

In an eighth embodiment shown in FIG. 11, end 186 of member 18 is covered by extended portion 45 of leg 41 of member 12. Extended portion 45 can be produced by cutting a length of the end portion of leg 47 of member 12 to surface 31, while leaving portion 45 uncut. The length of leg 47 can be cut using, for example, a saw, milling apparatus, or other suitable apparatus.

Figure 12:
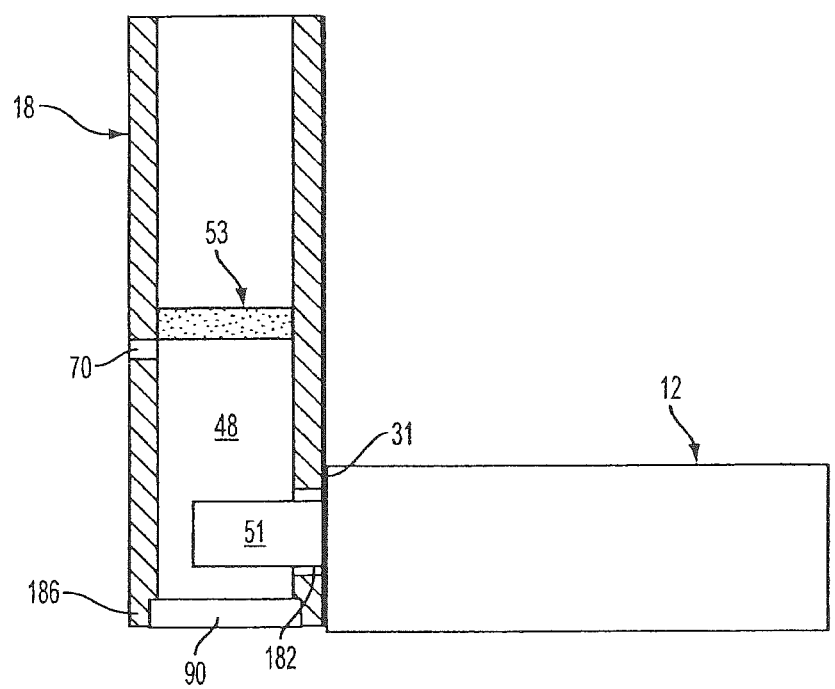
FIG. 12 shows a ninth embodiment with a tenon arrangement.

In a ninth embodiment shown in FIG. 12, member 12 is a conventional solid member that includes tenon 51. Tenon 51 fits into opening 182 in member 18, and resulting resin cavity 48 is filled with resin, as disclosed hereinabove. Opening 182 can be dimensioned for a snug fit with tenon 51, or can be dimensioned to allow a relatively large clearance, as shown in FIG. 12. Although a snug fit could reduce the likelihood of resin leakage, a looser fit provides a clearance to enable more precise location of member 12 relative to member 18 using a suitable fixture, without the need to locate and size opening 182 precisely. As shown in FIG. 12, an alternate end cap 90 is provided at end 186 of member 18.

Figure 13:
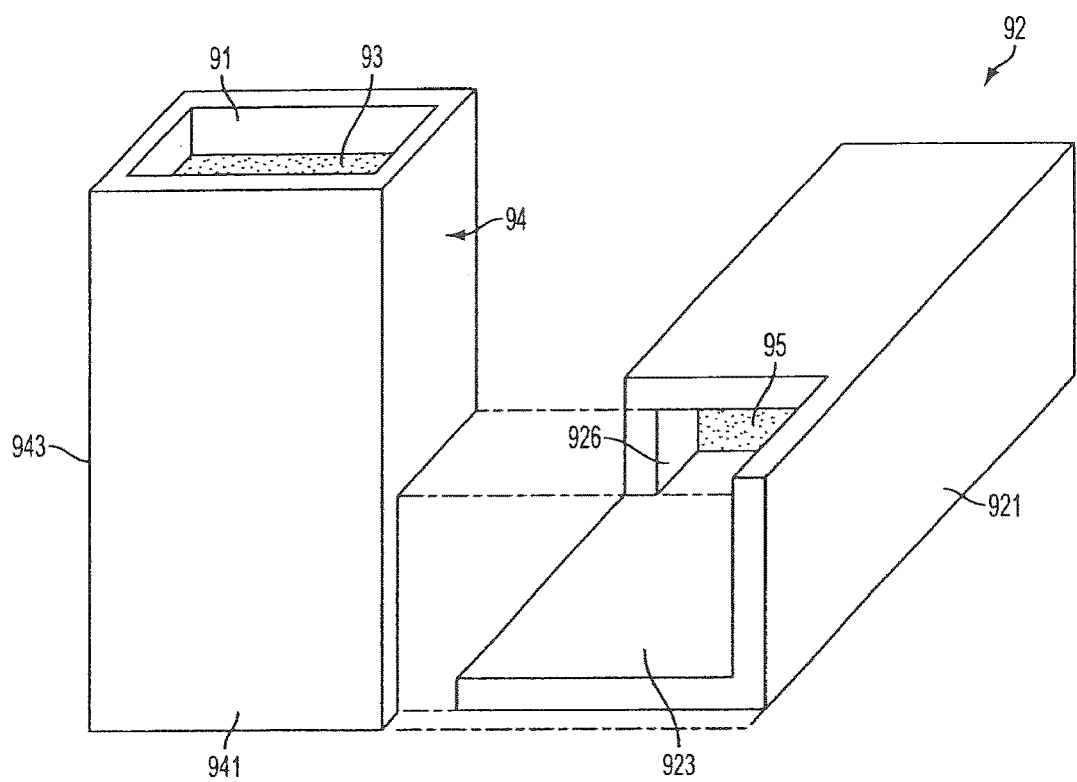
FIG. 13 shows a tenth embodiment with a cavity formed by two joined members.

In a tenth embodiment shown in FIG. 13, members 92 and 94 are shown as members with ends fabricated to form a joint cavity. When the members 92 and 94 are placed in a joining position, a joint cavity is defined by walls 921, 923, 941, and 943 (referenced but not visible in FIG. 13), along with a portion of inner surface 926 of member 92, a portion of inner surface 91 of member 94, other portions of members 92 and 94, and flow barriers 93 and 95. This joint cavity can be injected with a resin, as described hereinabove. Further, portions of the members being joined, such as, for example, walls 921, 923, and 941, which define the joint cavity when fitted together, do not necessarily define an enclosed space prior to joining, but define such after joining. In addition, the cavity formed does not have to be enclosed once the members are joined as the resin can form a part of the cavity or wall as detailed herein.

Figure 14:
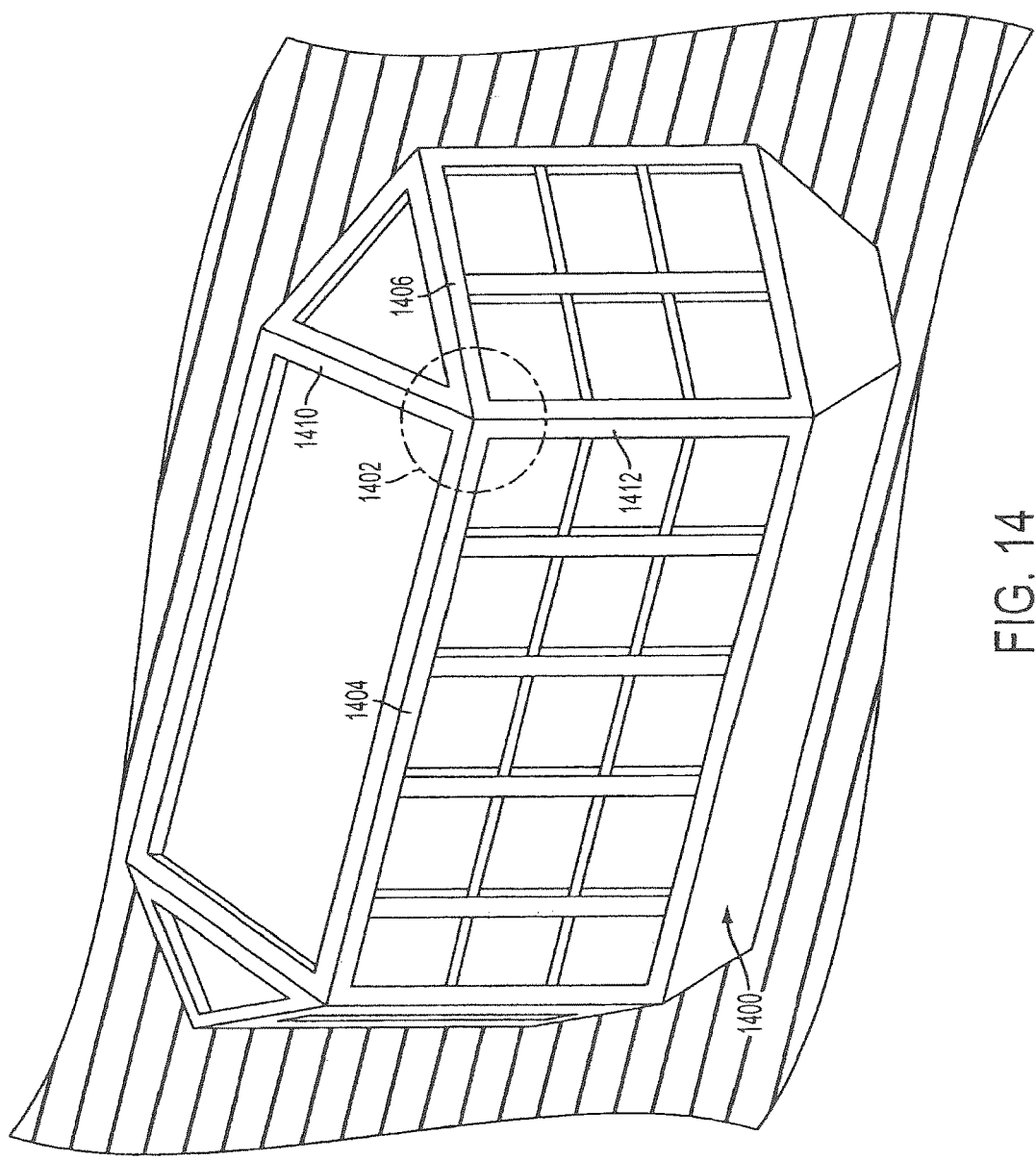
FIG. 14 shows an eleventh embodiment of joining more than two members and at non-ninety degree angles.
Figure 15:
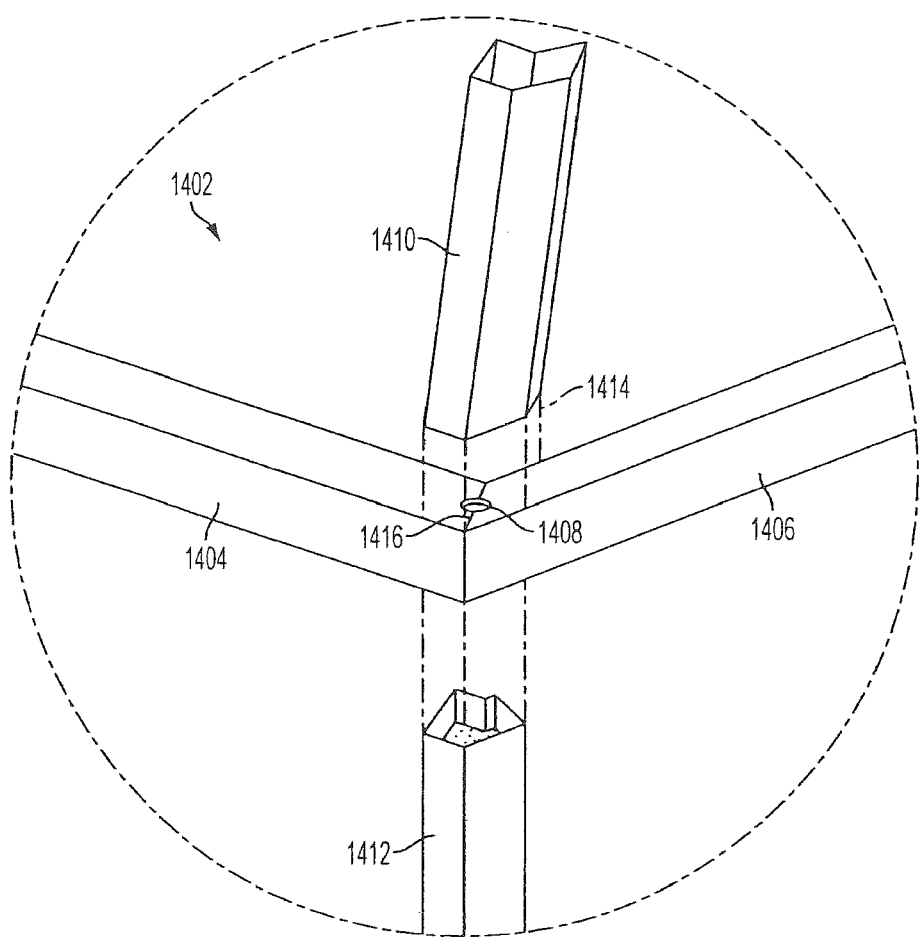
FIG. 15 shows a joining according to the eleventh embodiment in a 3-D arrangement at a joint.

Further, more than two members can be joined together. Referring to an eleventh embodiment shown in FIGS. 14 and 15, the corner 1402 of the frame of bay window unit 1400 involves the joining of four members, at various angles, as shown in an enlarged view in FIG. 15. Referring to FIG. 15, the joint can be formed by use of a miter joint for joining horizontal header members 1404 and 1406. Opening 1408 is provided on the upper side of the joint between members 1404 and 1406 to allow the flow of resin into roof member 1410, so as to form a mortise and tenon joint at end 1414 of member 1410 with surface 1416 of members 1404 and 1406. A similar opening, not visible in FIG. 15, is formed on the under side of the joint to form a mortise and tenon joint with vertical corner member 1412. Flow barriers, injection ports, vents, and other features can be provided in the manner disclosed hereinabove for two member joints. The angles at which the various members are joined can be determined entirely by the angles at which the ends of the members are cut, in combination with the angles at which the fixturing holds the members during injection and solidifying of the resin.

Inserts

Additional functionality can be incorporated to join members with or using inserts. These inserts are generally solid or semi-solid bodies placed in the joint cavity prior to injection of the resin. The inserts are then surrounded, or encapsulated, either wholly or in part, by the resin at injection, and become a part of the joined member(s) when the resin solidifies. The lower temperatures and pressures required by the present invention, along with the lower resin viscosity involved in joining members according to the present invention, allows a wide range of inserts to be used, with the inserts generally being unharmed by the injection process. The inserts can be formed of any material. If naturally occurring materials such as wood are used as inserts, such materials may require drying prior to use as inserts to avoid foaming at the interface between the wood and the resin, particularly if isocyanate is present in the resin, which can create a chemical reaction with the moisture.

An insert can be as simple as a closed box or other enclosure with a cavity formed therein that is placed in the joint cavity prior to injection of the resin, for the purpose of occupying space and thereby reducing weight and the quantity of resin required to form the joined member(s). If the insert with a cavity is made of a relatively strong material, with good adhesion to the resin, the insert can also serve a reinforcing function. For an insert to be most useful, it should be held in a predetermined location during injection of the resin. Because the resin can be injected at low pressure, and has relatively low viscosity, generally the tendency for the resin to dislocate the insert during injection is lessened, especially if the insert is held moderately firmly in place.

Figure 16:
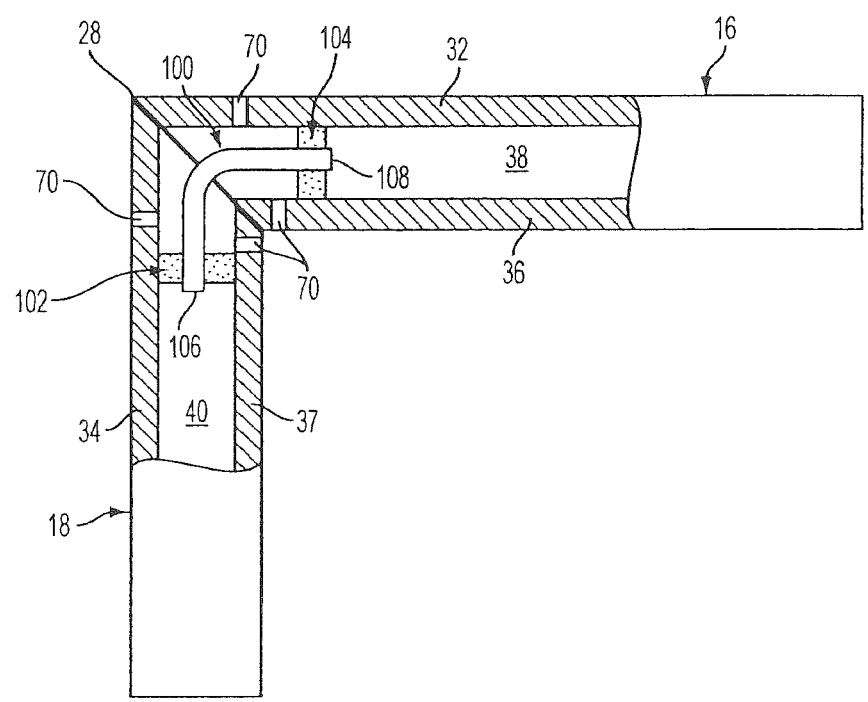
FIG. 16 shows a twelfth embodiment with a reinforcing member.

In a twelfth embodiment shown in FIG. 16, reinforcing member 100 is tubular. Reinforcing member 100 is shown with a cavity extending along its full length for weight savings, but could be solid or have a partial cavity as desired. Reinforcing member 100 is held in place by plugs 102 and 104, each of which is provided with an opening for receiving the reinforcing member. Member 100 can either be closed at each end, at either end, or can be open at both ends as shown in FIG. 16. Also, as shown in FIG. 16, ends 106 and 108 of member 100 extend respectively though plugs 102 and 104. Either or both ends 106 and 108 can optionally be closed, however, having ends 106 and 108 open provides fluid communication between the members being joined. Thus, the members can be vented to a single external vent, for example, providing pressure relief, which could be useful in hot weather or when undergoing extreme changes in altitude. Other devices for holding reinforcing member(s) in place during injection can also be used.

Figure 17:
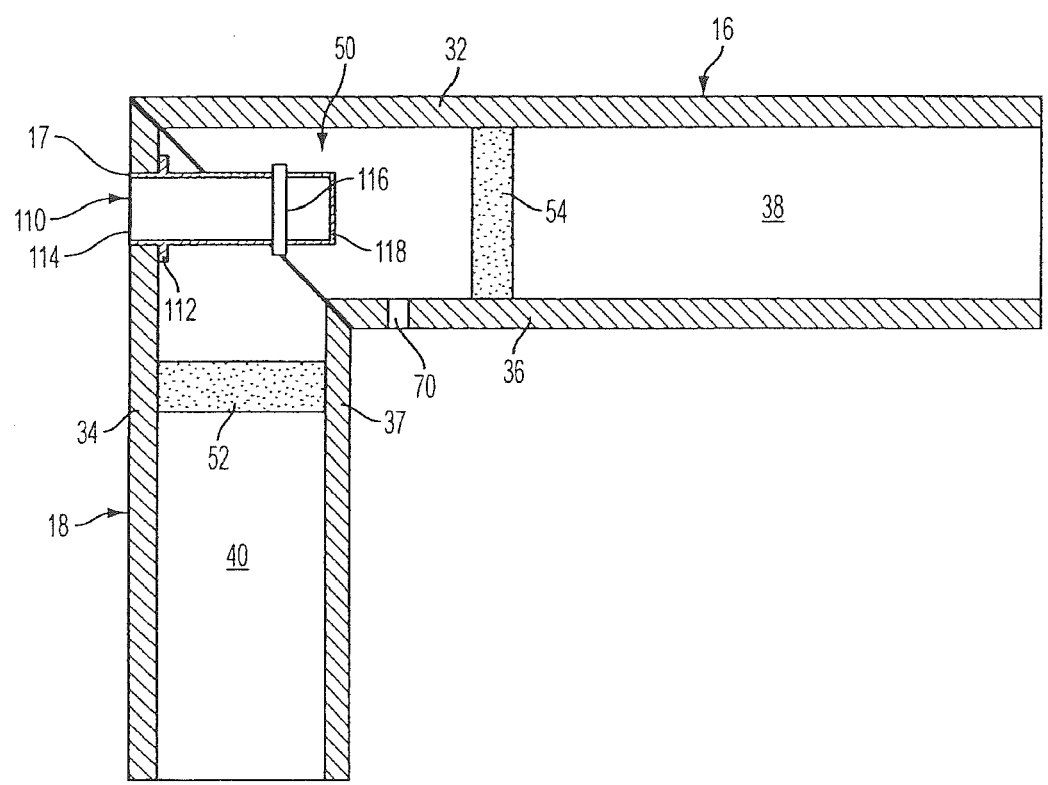
FIG. 17 shows a thirteenth embodiment with an insert capable of receiving hardware, such as a pivot pin.

The teachings of the present invention can also be used to provide inserts and other receiving devices capable of receiving and being coupled to pins, springs, parts, and components, etc., for example, such as those useful in window or door construction. For example, in a thirteenth embodiment shown in FIG. 17, members 16 and 18 are a stile and rail, respectively, for a tilt sash window. An opening 17 has been provided in wall 34 of member 18, and the opening 17 receives an insert 110, which is capable of receiving a pivot pin for the tilt sash window. Insert 110 extends into joint cavity 50 and is encapsulated by resin injected into joint cavity 50 to hold it in place. Insert 110 can be of any configuration and can optionally include a variety of useful features. For example, flange 112 can be provided to assure end 114 is flush with wall 34. Further, insert 110 can include an internal groove 116 capable of receiving a retainer spring or other device to hold the insert in place. Generally, such internal groove 116 could be provided between external end 114 and internal end 118. In other configurations, insert 110 can, for example, be internally threaded to receive a bolt or other threaded fastener. Further still, although insert 110 and opening 17 can be of any shape, generally, it is useful for the portion of the insert that passes through the opening 17 to be circular in cross section (opening 17 will generally match the insert in cross section). Circular cross sections (1) provide the manufacturing advantage that opening 17 can be made with only a drill and (2) avoid torsional stress concentrations in the wall that might lead to breakage.

Figure 18:
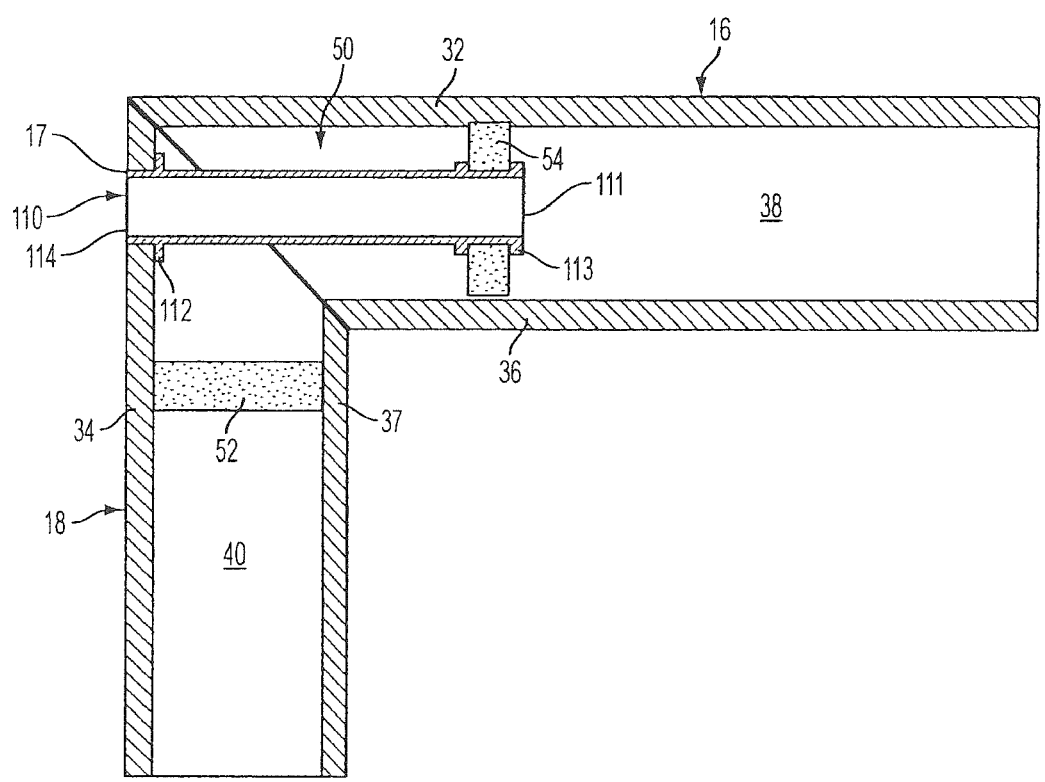
FIG. 18 shows a fourteenth embodiment with an insert that extends through the plug.

In a fourteenth embodiment shown in FIG. 18, insert 110 is open at both ends and extends through plug 54, thereby providing access to cavity 38. The configuration of insert 110 shown in FIG. 18 can be useful, for example, when insert 110 is adapted to receive a tilt latch for a tilt sash window. In such configuration, a cable that operates the tilt latch is passed from a central locking mechanism, through opening 111 at end 113 in insert 110. Tilt latch mechanisms of this type are disclosed, for example, in U.S. Pat. No. 7,070,215, which is commonly assigned to the assignee of the present invention and which is incorporated by reference as if repeated in its entirety herein.

Figure 19:
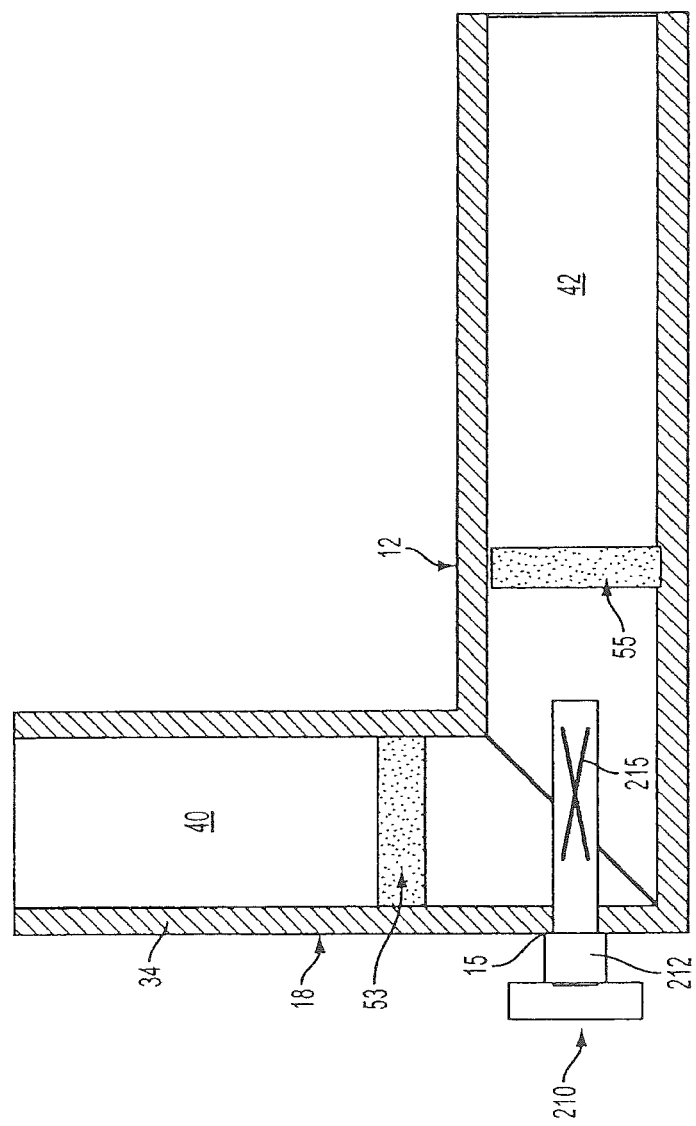
FIG. 19 shows a fifteenth embodiment where hardware, such as a pivot pin, is inserted through an opening in the wall, with the hardware protruding from the wall.

In other embodiments, inserts can be encapsulated directly into the resin, without the use of a receiving insert. As shown in a fifteenth embodiment shown in FIG. 19, prior to injection, insert 210 is inserted through opening 15 of wall 34 until collar portion 212 seats against member 18. Insert 210, shown in FIG. 19 forms, for example, a pivot pin for a tilt sash window. Insert 210 can contain various features, such as ridges, grooves, teeth, etc. labeled generally as 215, to improve the joining between insert 210 and the resin.

Figure 20:
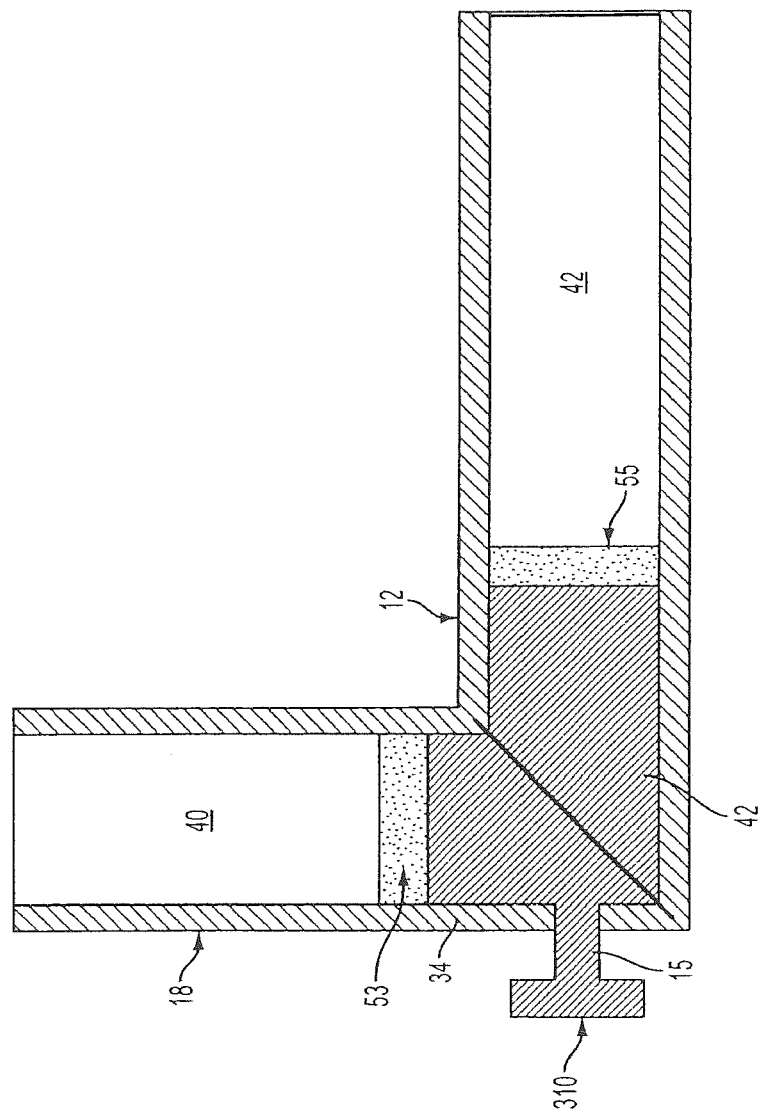
FIG. 20 shows a sixteenth embodiment where external features have been molded directly into the joint.

External features can also be molded directly into the joint. In a sixteenth embodiment shown in FIG. 20, external pivot pin 310 is formed in opening 15 of wall 34 of member 18 from the resin 42. A fixture is used in this embodiment to provide a mold for forming a flanged pivot pin 310. Flanged pin 310 can be reinforced by, for example, a metal pin encapsulated by the resin. The specific design of the fixture/mold, including the draft angles and other features, can be adjusted to form different sizes, shapes, and orientations as desired. Generally, the present resin is formulated to adhere to the interior surfaces of the cavity(ies) into which the resin is injected. Also, generally, the resin should exhibit limited shrink, or perhaps even a slight swelling, during solidification, so as to maintain intimate contact between the resin and the interior surfaces of the containing member. Molds used to form the features added to members as detailed herein can be made from polymeric materials having low surface energy, such as fluoropolymers and silicone materials. Further, depending on the level of precision needed in the molded portions, flexible mold materials can also be used in some instances. Further still, in some applications disposable molds can be utilized.

Figure 21:
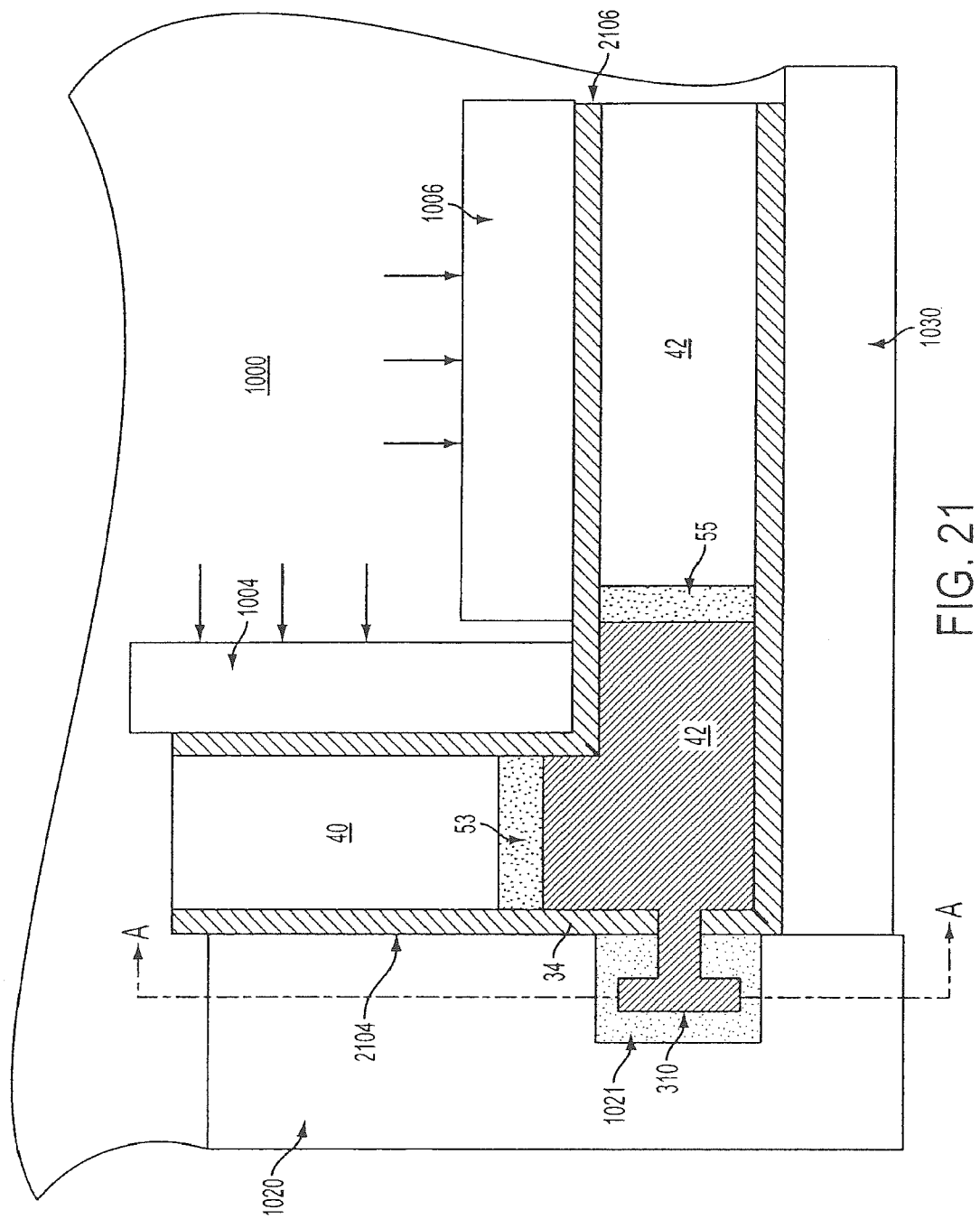
FIG. 21 shows a mold used to create the external feature shown in FIG. 20.
Figure 22:
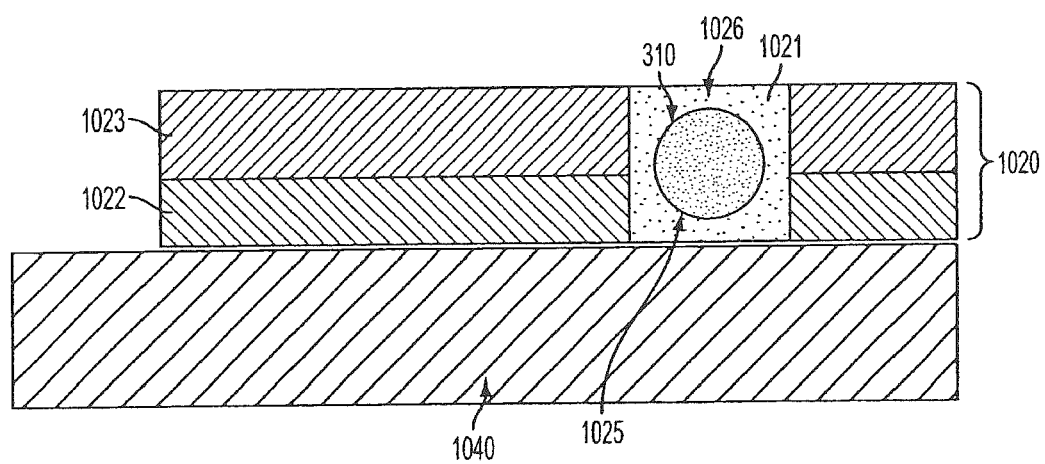
FIG. 22 shows a cross section of the mold shown in FIG. 21.
Figure 23:
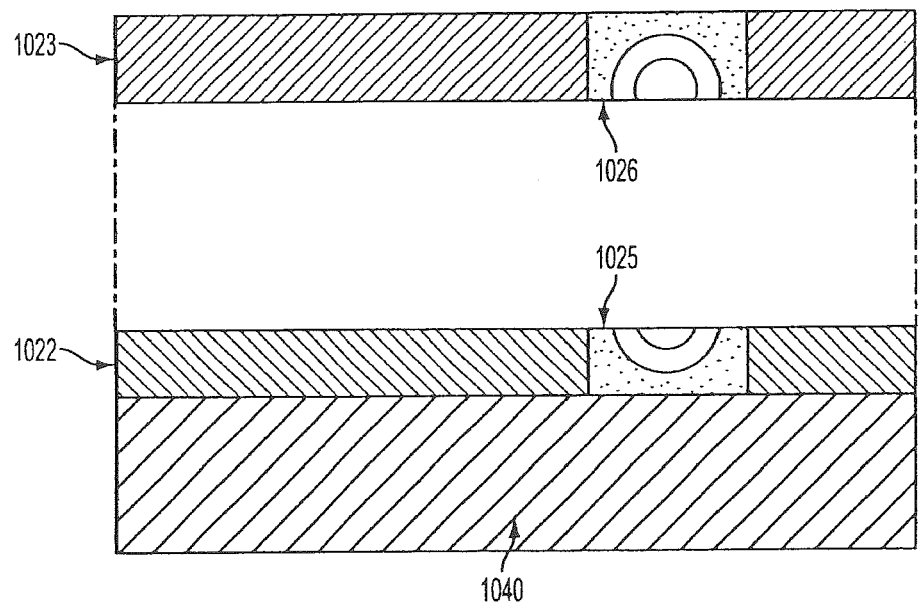
FIG. 23 shows the mold shown in FIGS. 21 and 22 with the sections separated.

As shown in FIGS. 21, 22, and 23, fixture members 1020 and 1030 are portions of a whole unit fixture, fixedly attached to base plate 1000, with sliding fixture members 1004 and 1006 urging workpiece members 2104 and 2106 against them. Although a mold can be removable from a fixture and exchanged for other molds, mold 1021 is shown built into member 1020 to form flanged pivot pin 310. As shown in FIG. 21, section A-A shows a slice of the mold 1020 and 1021 shown in FIGS. 22 and 23. Referring to FIGS. 22 and 23, fixture member 1020 is made up of a lower part 1022 and an upper part 1023. Similarly, mold 1021 is made up of a lower part 1025 and an upper part 1026. As shown in FIG. 23, this allows the mold to be opened in order to remove the finished assembled unit with molded portion 310. Because of the lower temperatures and pressures used, and depending on the level of precision required for the molded part, mold 1021 can be made of a less rigid material, having, for example, a lower elastic modulus than that of the resin, so as to reduce internal stresses that can result from any incompatibilities therebetween.

In this exemplary molding, mold 1021 is provided as a relatively small insert in fixture member 1020, which allows relatively easy replacement if worn or damaged. In addition, if different versions of the product are to be produced, requiring, for example, different molded parts, the fixture can be easily refitted for the new version merely by replacing the mold insert. In some situations, incorporating mold 1021 directly into fixture member 1020 without the use of inserts can be more expedient.

Figure 24:
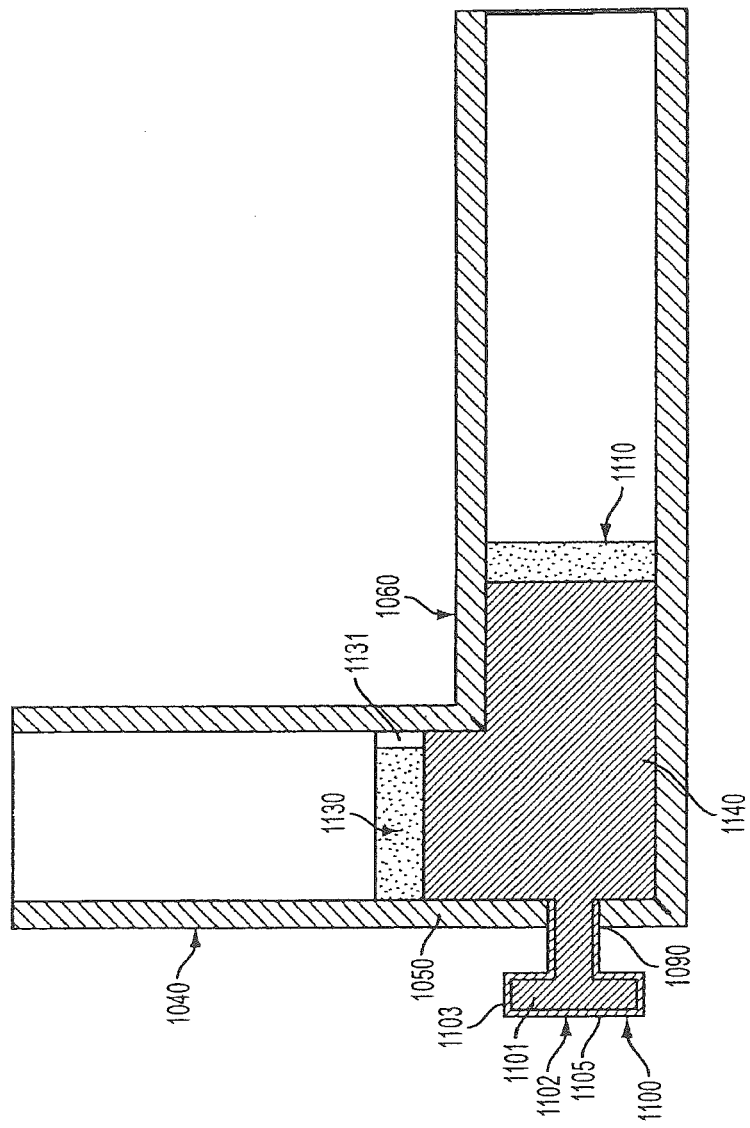
FIG. 24 shows another mold inserted into the member opening to form an external feature.

In FIG. 24, external feature 1100 is incorporated into joining 1140 by use of pre-formed member 1102 with a cavity, which is inserted into opening 1090 prior to injection and held in place, if necessary, by a fixture, not shown. The joint cavity and member 1102 are then filled with resin, resulting, after solidifying, in an external feature having the external surface of member 1102 and being structurally supported by the resin, making member 1102 part of the finished product. Generally, the injection port(s), the vent(s), and orientation of the parts during injection and solidification of the resin are arranged to avoid air entrapment. Member 1102 can be formed of any material, though metals can be especially useful due to their strength and resistance to frictional wear. Other materials can include polymeric materials having structural, frictional, wear, color, or other properties especially suitable for particular applications. For example, the interior surface of member 1102 can exhibit an adhesion promoting property with the resin. Further, although member 1102 is shown in FIG. 24 as forming a complete enclosure, such need not be the case. For example, the member can be open at surface, and, during injection, the surface can then be covered by a portion of a fixture until solidification is complete. Optionally still, a separate cover can be provided for covering the surface.

Figure 25:
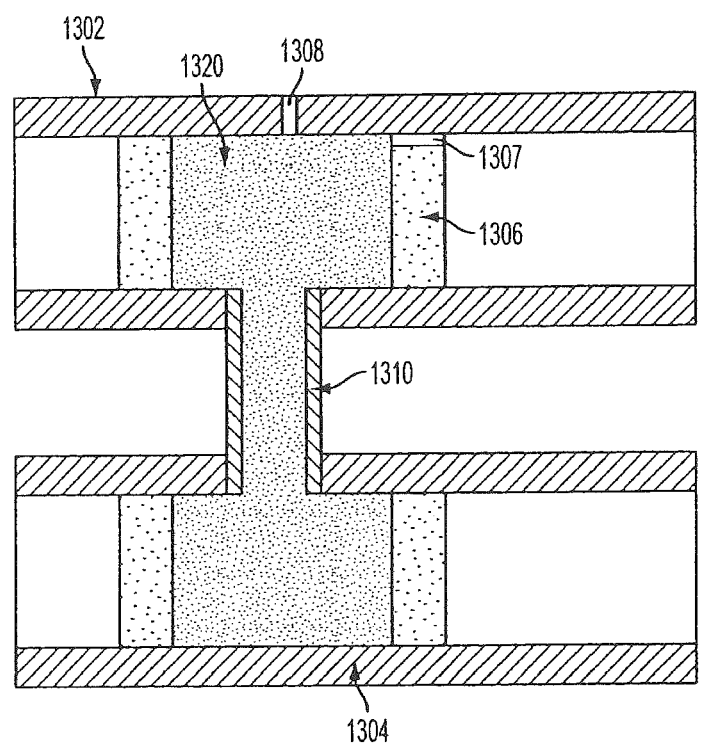
FIG. 25 shows a tubular portion used to mold two members that are not immediately adjacent.

Joining of members is not limited to joining immediately adjacent members. Referring to FIG. 25, members 1302 and 1304 are coupled by tubular portion 1310, which is filled with resin 1320. In FIG. 25, internal vent 1307 is provided in flow barrier 1306, at approximately the same vertical level as injection port 1308. The tubular member 1310 can be formed of similar material as members 1302 and 1304, or can be formed of a different material depending on particular product, application, location, etc. Embodiments that do not utilize tubular member 1310 are also possible. Further still, the function of containing resin 1320 during its fluid state could be provided by a mold inserted between members 1302 and 1304 during injection of the resin.

Figure 26:
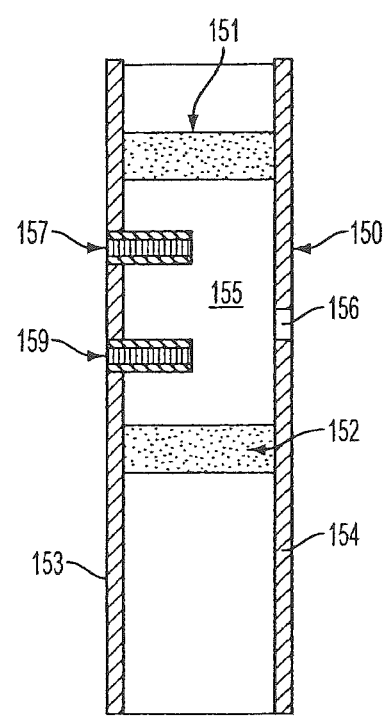
FIG. 26 shows a seventeenth embodiment where injection occurs at a location along a member to hold inserts.

Teachings of the present invention can also be applied in locations other than in corners and/or joints. Referring to a seventeenth embodiment shown in FIG. 26 resin is injected at a location along a member 150. The member includes walls 153 and 154 and has plugs 151 and 152 inserted therebetween to define a cavity 155. As shown in FIG. 26 threaded inserts 157 and 159 can be included in a wall, shown here in wall 153, and an aperture 156 (analogous to apertures 70 detailed above) can be included in a wall, shown here in wall 154. Threaded inserts 157 and 159 are shown inserted in holes drilled in wall 153, prior to injection of resin into cavity 155. Generally, inserts 157 and 159 can be press fit, for example, into the receiving holes to hold them in place and prevent leakage of resin. Alternatively, a fixture can be used, for example, to precisely locate and orient the inserts. After injection and solidification of the resin in cavity 155, the inserts can be used to hold, for example, a hinge or an attachment bar for a casement window operator. Because the area of joining between the resin in cavity 155 and member 150 can be made relatively large, joining of devices such as hinges and operator bars can be very robust, even when the walls of member 150 are relatively thin.

Figure 27:
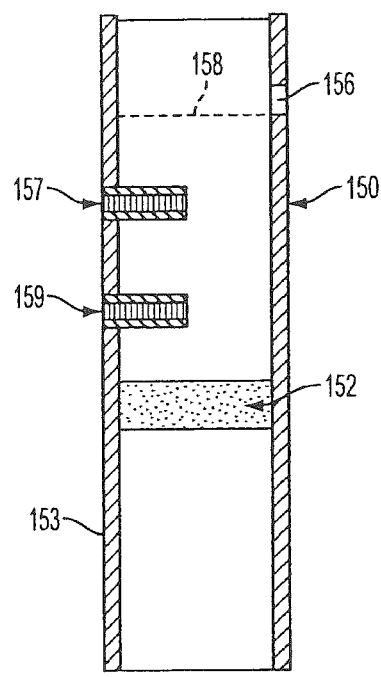
FIG. 27 shows an eighteenth embodiment with a member oriented in a vertical direction then filled with resin to a level.

In an eighteenth embodiment shown in FIG. 27, member 150 is oriented in the vertical direction and injection port 156 is placed at a level above top insert 157. Resin is then injected to level 158. This embodiment has the advantage of only requiring one flow barrier 152.

Figure 28:
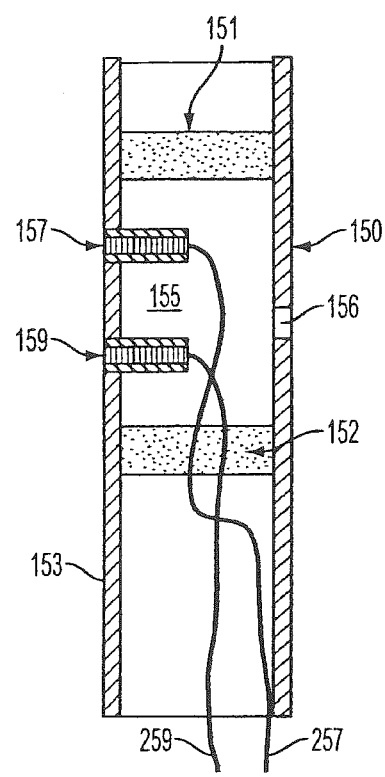
FIG. 28 shows inserts that function as electrical terminals.
Figure 29:
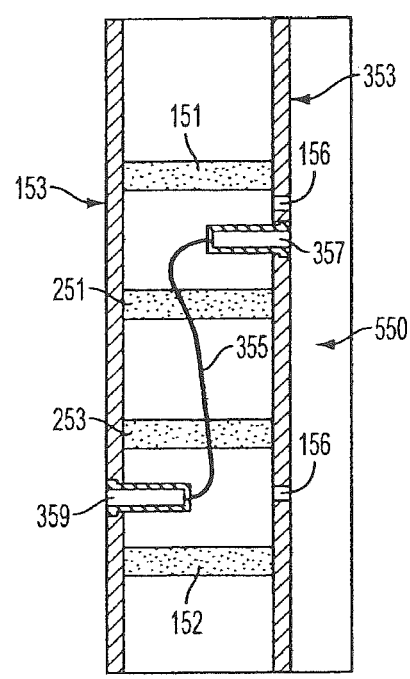
FIG. 29 shows an internal coupling of electrical terminals.

Inserts can also serve functions other than mechanical. Referring to FIG. 28, inserts 157 and 159 are electrical terminals, or, alternatively, devices for receiving electrical connectors. Inserts 157 and 159 can be connected via connections 257 and 259. FIG. 29 shows an alternative arrangement of connectors 357 and 359, connected by wire or other joining 355. The arrangement shown in FIG. 29 provides additional inserts 251 and 253. Electrical connections of this type are particularly useful in windows using variable transmission devices (indicated generally at 550), such as electrochromic coatings, in order to connect the glazing unit to a controller and power source. This type of connection could also be used to conceal and protect intrusion detection devices.

Figure 30:
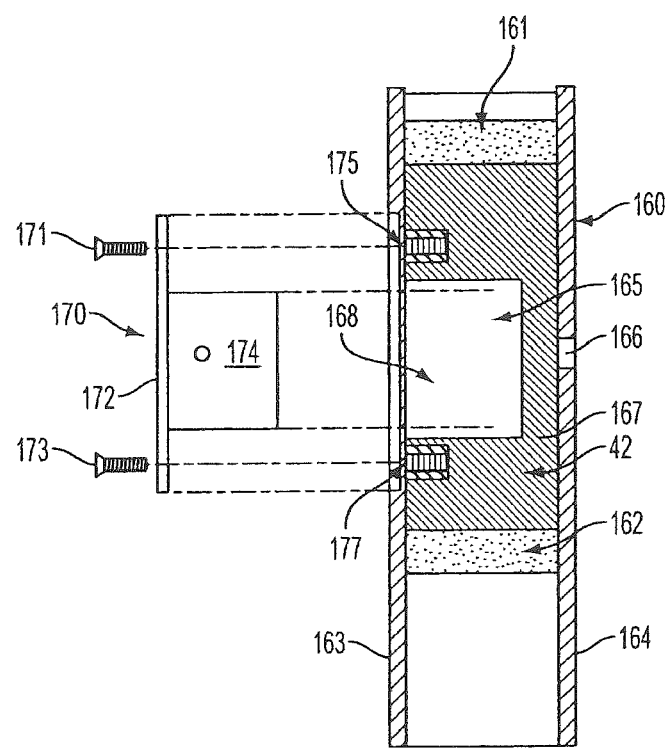
FIG. 30 shows a nineteenth embodiment where the resin is used to provide a lock cavity and mortise for receiving the faceplate of a lock.

In a nineteenth embodiment shown in FIG. 30, the resin can be used to provide a lock cavity and a mortise for receiving the faceplate of the lock. When locks are inserted in cavities in members of a door, often the face plate of the lock rests above the surface of the member, since, generally, it is not feasible to provide a mortise to receive the face plate of the lock due to insufficient wall thickness of either edge of the door adjacent such mortise. As shown in FIG. 30, opening 168 has been formed by injecting resin 42 into cavity 165 between walls 163 and 164 of member 160, and inserts 161 and 162, to form a block 167. The opening 168 is formed to receive faceplate 172 of lock 170 in a closely fitting manner. If face plate 172 is thinner than wall 163, block 167 can extend into opening 168 only a distance equal to the difference between the thickness of wall 163 and the thickness of face plate 172, thereby enabling the outer surface of face plate 172 to fit flush with wall 163. If face plate 172 is thicker than wall 163, block 167 can be molded to allow a deeper mortise, equal to the thickness of face plate 172 to allow flush fitting with the surface of wall 163. Threaded inserts 175 and 177 can also be provided (either by cutting in or by forming) for receiving screws 171 and 173, respectively, for holding lock 170 in place, with lock body 174 disposed in opening 168. Alternatively, in lieu of molding the resin in the shape shown in FIG. 30 to receive the mortise, opening 168 can be cut into formed resin 42 with a tool or tools.

Figure 31:
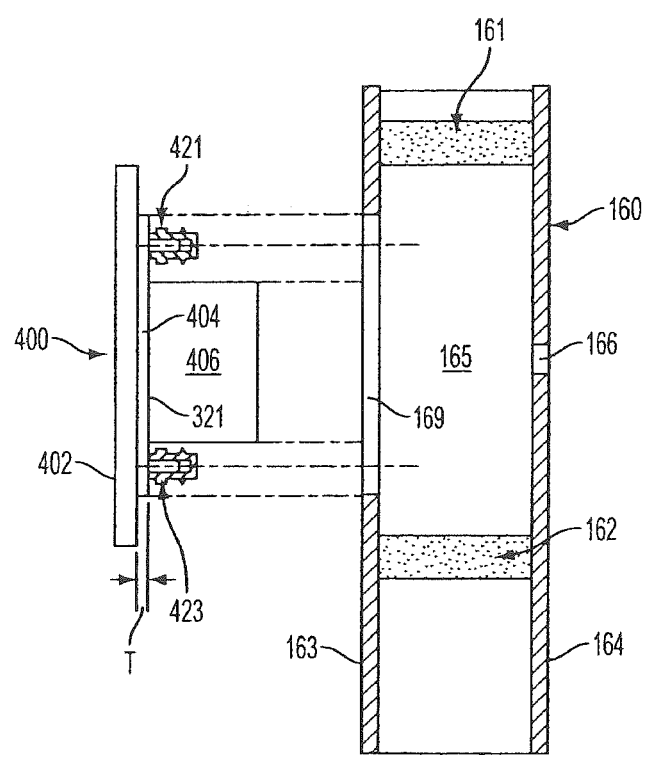
FIG. 31 shows an insert for forming a block, such as the one shown in FIG. 30.

FIG. 31 shows a tool for forming a block, such as that shown at 167 in FIG. 30. Tool 400 includes base plate 402, which is adjacent face plate replica portion 404, which, in turn, is adjacent core portion 406. Insert holding pins 421 and 423 extend from portion 404 to hold the inserts 175 and 177 prior to injection of resin. Member 160 is prepared for injection by first forming opening 169 in wall 163. Opening 169 generally has substantially the same outline as face plate replica portion 404. Injection port 166 is also drilled or otherwise formed at this point. Plugs 161 and 162 are inserted, typically with the aid of a depth gauging tool to assure proper location. Inserts 175 and 177 are inserted onto insert holding pins 421 and 423, respectively. Tool 400 is then inserted into opening 169, taking care to fit replica portion 404 into opening 169, fitting base plate 402 tightly against wall 163. Tool 400 is clamped, or otherwise firmly held in place, and resin is injected through injection port 166. Generally, it is convenient to orient member 160 in a horizontal direction, with opening 169 facing downward, and injection port 166 facing upward, at the high point of cavity 165. After the resin 42 has solidified sufficiently, tool 400 is removed, leaving inserts 175 and 177 behind. Various holes can be drilled in appropriate locations to receive shafts or other parts for operating the lock. Finally, the lock is installed, as shown in FIG. 30, wherein screws 171 and 173 are screwed into inserts 175 and 177.

Figure 32:
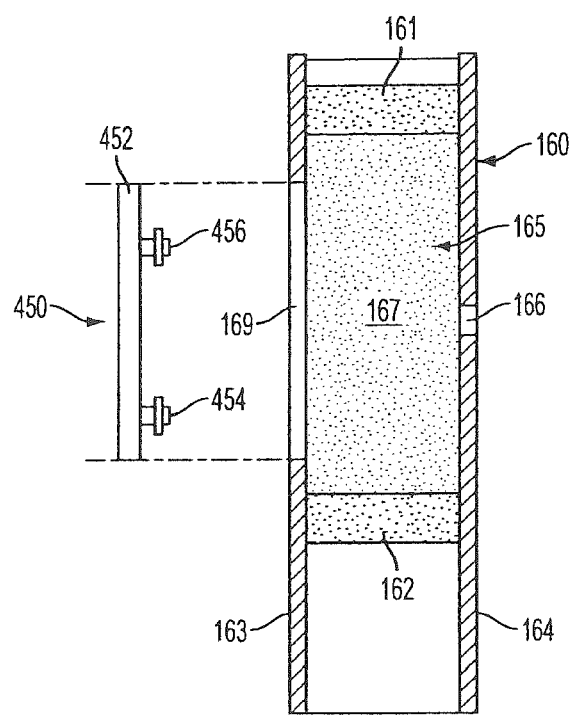
FIG. 32 shows a twentieth embodiment showing optional anchoring bosses.

In a twentieth embodiment shown in FIG. 32, plate 450 is fitted into opening 169 of member 160, and held in place in cavity 165 by resin 167. Optional anchoring bosses 454 and 456 can be provided for holding plate face 452 in place, but may not be needed when adhesion of plate face 452 to resin 167 is adequate.

Resin Formulations

Resin formulations can be thermoplastic or thermoset and generally need to exhibit an unique combination of properties not required in other applications. For example, one such property is adhesion to the interior surfaces of extruded members, both for structural strength and for sealing. Adhesion of a polymerizing material, particularly a significant volume of material, can be sensitive to shrinkage, which typically occurs during polymerization of many materials. Moreover, sealing against leaks can be improved if the resin can expand slightly during solidifying, to improve contact with the interior surfaces of the members. Any such expansion generally must be limited to levels that do not disrupt the bonding process, or cause mechanical damage to the members. The ability to control dimensional changes within a narrowly defined range during solidifying is another useful property for resins used to join members. Dimensional changes can be controlled, for example, by the use of appropriate fillers, with solid fillers tending to reduce shrinkage. Fillers containing a controlled amount of moisture can provide a controlled amount of expansion, which can partially or completely offset polymer shrinkage or produce a net expansion of the resin upon solidifying.

Solid fillers are also useful for improving the properties of the resin both before and after injection and solidifying. Solid fillers can be used either singly or in combination. For example, using walnut shell flour can provide a controlled source of water helpful in providing a controlled level of expansion during solidification. Certain inorganic fillers, particularly those having crystallization, can also provide a closely controlled source of water. Fillers can also be used to impart rheological properties to the resin that can be useful during the injection process and can also be used to increase the elastic modulus of the resin.

Another useful property of the resin is the ability to control closely the elastic modulus of the resin, due to the tradeoff between structural rigidity of the finished structure and reliability of sealing. Structural rigidity is increased by increasing the elastic modulus of the resin, while sealing can often be made more reliable by reducing the elastic modulus of the resin. Elastic modulus can be adjusted by the choice of materials, as well as by the use of solid fillers.

Handling of the resin prior to solidifying also presents special problems, in particular leakage from the joint. When two members with cavities are to be joined, the interface between them is unlikely to be a perfect fit. Therefore, regardless of how small the resulting gaps in the joint may be, there is a tendency for the resin to leak out during injection and, upon solidifying, form an unsightly ridge or bump of resin leaked at the seam between the two members. Any such leakage can be greatly reduced by making the resin thixotropic. As used herein, a thixotropic material includes a flowable material that forms a non-flowing, gel-like structure when at rest, when no shear stress is applied to it, but which undergoes a change to a flowable liquid when a certain threshold level of shear stress is applied. Non-thixotropic liquids can be made thixotropic by the addition of thixotroping agents such as fumed silica or certain polymeric materials. Because of the relatively low pressures in the joint cavity during injection, resins that are thixotropic can be formulated to have a static shear threshold sufficiently high to resist any fluid pressures that might otherwise cause leakage.

Generally, the resin comprises a first liquid reactant, such as a polyol, and a second liquid reactant, such as an isocyanate, which reacts with the first reactant to form a solid polyurethane material. Amine or other groups that react with isocyanates can also be useful, for example to adapt the reaction rate to a particular application. Blends of more than one polyol or other isocyanate-reactive material can also be used to adjust more precisely the properties of the resin. Other liquid materials can also be included as needed to achieve desired end properties of the resin.

Resin formulations have been found that are less prone to leakage through small gaps, and can be used with open fixturing systems. In particular, resins that are thixotropic can be injected into joint cavities at low but effective pressures, without leakage from interface gaps. Since open fixturing systems can be used, fixturing costs and complexity are reduced. Further, the present invention can impart thixotropic properties to liquid reactants that are not thixotropic by the addition of commercially available materials such as fumed silica and other rheological modifiers. Further still, other solid fillers, such as, for example, potter's beads in combination with the fumed silica, can provide additional leak reduction and can reduce shrink. Table 1 summarizes useful components for resins and their effects.

TABLE 1

| COMPONENT | FUNCTION |
|---|---|
| Polyol | Reacts with isocyanates to form polymer matrix |
| Isocyanate | Reacts with polyol to form polymer matrix |
| Fumed silica (Cab-O-Sil) | Thixotropic agent, moisture source, leakage reduction, shrink reduction |
| Potter's beads | Leakage reduction, shrink reduction, increased elastic modulus |
| Walnut shells | Moisture source, shrink reduction, increased elastic modulus |
| Talc | Thixotroping agent, shrink reducing agent |
| Calcium carbonate | Thixotroping agent, shrink reducing agent |
| Wollastonite | Leakage reduction, shrink reduction, increased elastic modulus |
| Milled Glass | Leakage reduction, shrink reduction, increased elastic modulus |
| Ceramic Spheres | Leakage reduction, shrink reduction, increased elastic modulus |
| Rice Hulls | Thixotroping agent, moisture source, leakage reduction, shrink reduction, increased elastic modulus |
| Boiler Ash/Fly Ash | Thixotroping agent, moisture source, leakage reduction, shrink reduction, increased elastic modulus |

Figure 33:
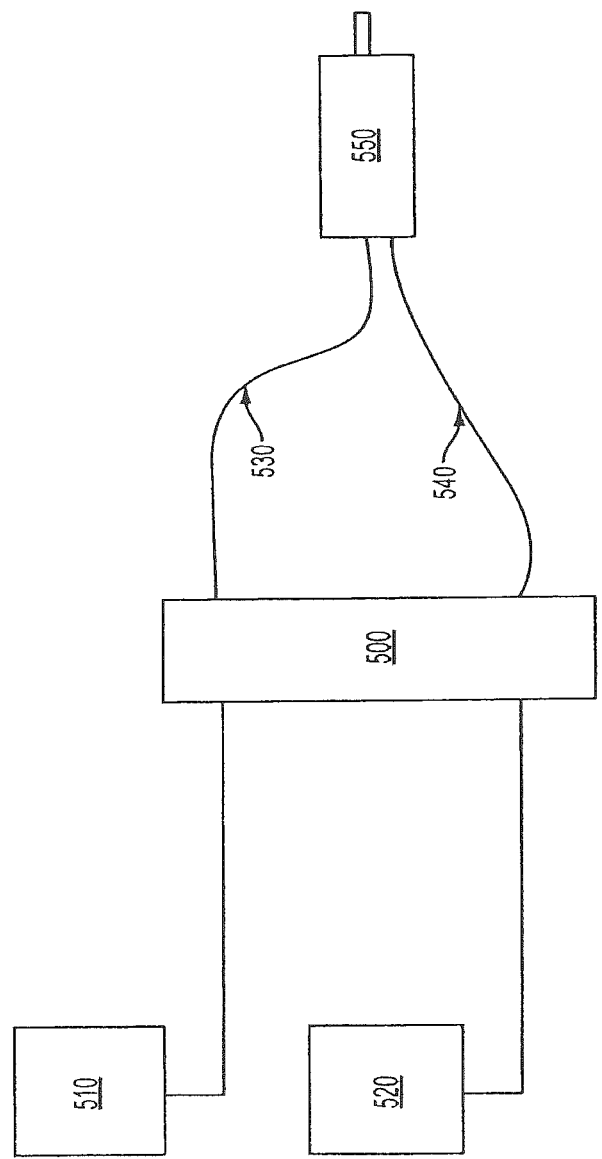
FIG. 33 shows a pumping and mixing apparatus for a two-part resin.

FIG. 33 shows schematically a pumping and mixing apparatus for combining and injecting a two-part resin. Tank 510 can contain, for example, a polyol, along with one or more premixed filler materials, and tank 520 can contain, for example, an isocyanate. In principle, the isocyanate in tank 520 can also contain filler materials, but it has been found that since fillers typically contain moisture, and since isocyanates are typically moisture sensitive, generally fillers are not added to the isocyanate. Pumping and metering system 500 pumps the polyol and the isocyanate, in a predetermined ratio, to mixing and injection device 550. System 500 can comprise a pair of gear type pumps, one for the polyol and one for the isocyanate, with the volume ratio being controlled, for example, by the relative speed of the two pumps. Mixing injector 550 typically connects to the pumps by flexible tubes 530 and 540 and generally combines and mixes the two materials. Mixing injector 550 can be hand held, mechanically operated, for example by a robotic apparatus, or fixed in one location. When used in whole unit fixturing, multiple mixing injectors can be used, for example with one device placed in a fixed location at each injection site. Mixing injector 550 can further incorporate timing or metering devices to control the quantity of resin injected. Mixing can be provided by a static mixer, a dynamic mixer, an impingement mixer, or other suitable mixer. Generally, equipment capable of mixing and injecting resins that contain fillers is preferred since adding solid filler materials to the resin provides useful property improvements to the resin.

Some resin formulations do not lend themselves to processing by the system described above. For example, gear pumps generally are not reliably able to pump resins containing highly abrasive filler materials or high loadings of certain filler materials. In such cases, alternative pumps, such as piston type pumps, can be used. Further, while premixing of filler materials with the polyol is convenient and often reliable, some fillers do not lend themselves to premixing, and will need to be injected separately or incorporated in some alternative manner. Alternative methods of filler incorporation can also be used, where necessary or suitable.

Alternative embodiments for defining the joint cavity are also possible. For example, in one alternative embodiment, the extent of the joint cavity is not defined by a particular plug or other barrier, instead flow of the resin is limited by orienting the fixture in a vertical plane with the cavity of each member extending upward at an angle from the joint, such that gravity causes the resin to flow downward to the joint. In another such exemplary alternative embodiment, the reaction rate of the resin is formulated to be sufficiently rapid to enable the resin to solidify a short time after injection, thereby making the flow self-limiting or self plugging to define automatically the extent of the member, without the need for barriers to define the joint cavity.

In the following examples, mixing and injection of the resin was provided by an RPM NorCal mixing and injection apparatus, available from RPM NorCal, located in Loomis, Calif. Pumping and metering is provided by two gear type pumps. Pump speed controllers control the relative speeds of the two pumps. Once the relative pump speeds have been set, the overall speed of the two pumps can also be set, while maintaining the same ratio of speeds between the two pumps, so as to control the flow rate of the resin, while also maintaining the desired proportions of the two components.

Example 1

A filled polyol premix was formed by combining 37 parts by weight of Nytal talc, grade 400, available from R.T. Vanderbilt Company, Inc., located in Norwalk, Conn., with 63 parts by weight of the polyol, or B, portion of BAYFLEX XGT-140 polyurethane reaction injection molding system, available from Bayer MaterialScience, located in Pittsburgh, Pa. The polyol premix was loaded into tank 510, shown in FIG. 33, and a quantity of the isocyanate, or A, portion of the XGT-140 system was loaded into tank 520. Pumping and metering device 500 was adjusted to provide a weight ratio of isocyanate (part A) to polyol (part B) of 162:100, as prescribed by Bayer. The premix and A portion were transported through flexible tubing 530 and 540, to mixing injector 550, which in this case comprised a handheld injection gun and a static mixer. The injector gun was used in a hand held mode to inject metered amounts of the mixed resin into corner joints prepared as test joints.

Test joints were prepared in groups of four from FIBREX® members having lengths suitable for producing a standard size rectangular window sash having mitered corners. Polyethylene foam plugs were die cut to fit into the ends of the members and inserted into each end of each member to form a joint cavity of the desired dimensions at each corner of the sash when the members were assembled. Injection ports were drilled at appropriate locations near each end of each member. The members were then placed in a rectangular fixture in positions to produce a sash of the desired dimensions. Each joint cavity was then injected with a quantity of the resin sufficient to fill it, and the resin was allowed to solidify. After an initial time of about one minute, though a shorter time might be adequate in some cases, the joints were sufficiently solid to allow the sashes to be removed from the fixture and handled without damage. The joints were inspected for resin leakage, with no ridges or bumps due to resin leakage being found.

The sashes were glazed with standard dual pane glazing units, using commercially available silicone glazing adhesive and sealant. The sashes were further assembled into window units, which were then tested for water infiltration using industry standards or recommended testing procedures. No water leakage was detected.

Cavities for receiving resin can also be defined without the use of plugs, for example the members themselves could include cavities bordered by solid interior walls that stop the flow of resin. Alternatively, the resin itself can define the joint cavity, without plugs.

Figure 34:
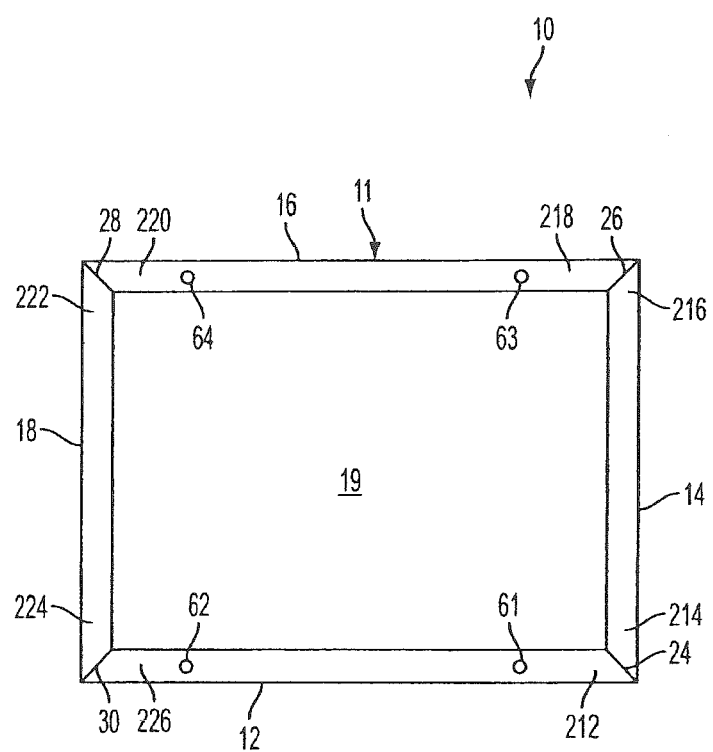
FIG. 34 shows a sash frame assembled according to the invention.

Having discussed in general terms the arrangement and features of the corner joints of frames used in window sashes, door panels, and window and door frames, a method for making such frames (such as that shown in FIG. 1) will now be discussed with reference to FIG. 34. In an initial step, not depicted in FIG. 34, rails 12 and 16 and stiles 14 and 18 are cut to the proper length according to the particular dimensions of window sash, door panel, or window or door frame. The ends of the rails and stiles are then prepared for joining by either miter cutting, as shown in the embodiment depicted in FIG. 34, or other finishing process. Next, rails 12 and 16 are outfitted with injection ports 61, 62, 63, and 64 for use during a later step of the joining process. Injection port 61 is positioned proximate a first end 212 of rail 12, while injection port 62 is positioned proximate a second end 226 of rail 12. Similarly, a third injection port 63 is positioned proximate a first end 218 of rail 16 and a fourth injection port 64 is positioned proximate a second end 220 of rail 16. Alternatively, the injection ports can be positioned in stiles 14 and 18 proximate ends 214, 216 and 222, 224 and the corner joints. Additionally, this step can be performed at a later point in the assembly process, according to the particular arrangement and aspects of the assembly location or personnel.

Rails 12 and 16 and stiles 14 and 18 are then positioned such that the first end 212 of rail 12 meets the first end 214 of stile 14, and the second end 226 of rail 12 meets the first end 224 of stile 18. The first end 218 of rail 16 meets the second end 216 of stile 14, while the second end 220 of rail 16 meets the second end 222 of stile 18. In this way, the rails and stiles come together to form frame 11. Depending on the particular specifications of frame 11, reinforcing keys 44 (FIG. 4) can be inserted into the internal cavities of adjoining rails in stiles during assembly as discussed hereinabove.

Figure 35:
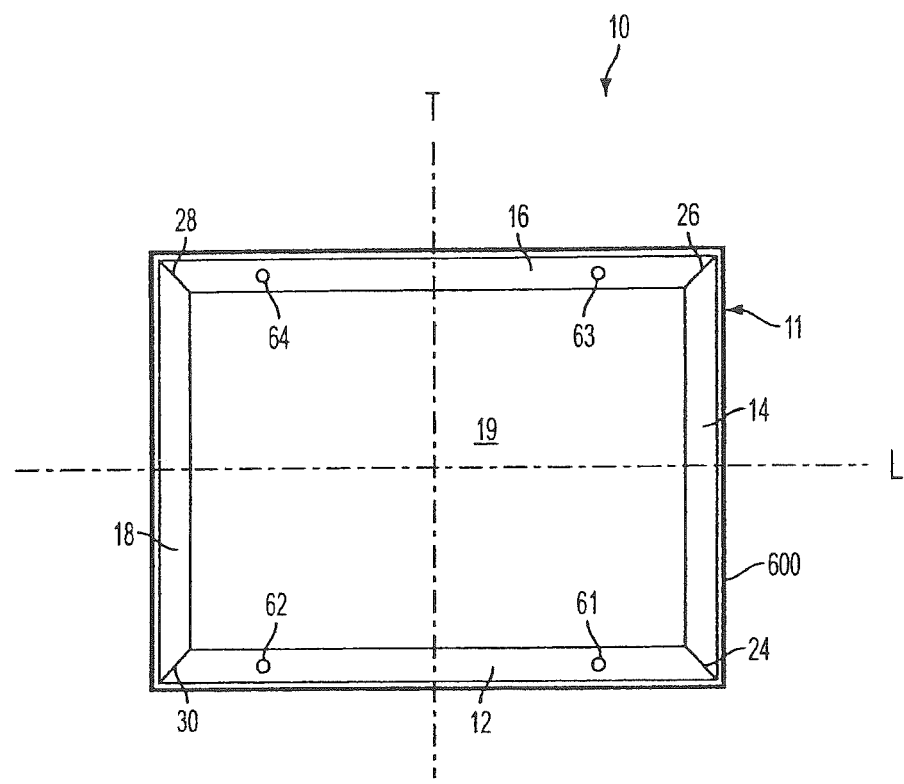
FIG. 35 shows a front elevation view of a window sash frame during assembly.

Turning now to FIG. 35, rails 12 and 16 and stiles 14 and 18 are arranged to form frame 11 shown as having a generally rectangular shape with a longitudinal axis L and a transverse axis T, the transverse axis T being generally perpendicular to longitudinal axis L. Once properly arranged, the rails and stiles are generally clamped or held together to maintain their arrangement by a suitable clamping or holding arrangement. Any suitable clamping mechanism can be used such as, for instance, corner clamps, pneumatic clamps, or a clamping jig specifically designed for holding the rails and stiles together. As shown in FIG. 35, a compression belt 600, commonly known as a belt clamp, is positioned around the perimeter of the frame and is then tightened. The tightening action of belt clamp 600 applies a compression force on the rails and stiles to hold them together at the corner joints and to ensure that the corner joints remain tight until resin can be introduced into each corner joint. Once belt clamp 600 is fully tightened around frame 11, the frame is placed in a generally upright orientation such that stiles 14 and 18 and transverse axis T are generally vertical, while rails 12 and 16 and longitudinal axis L are generally horizontal.

Figure 36:
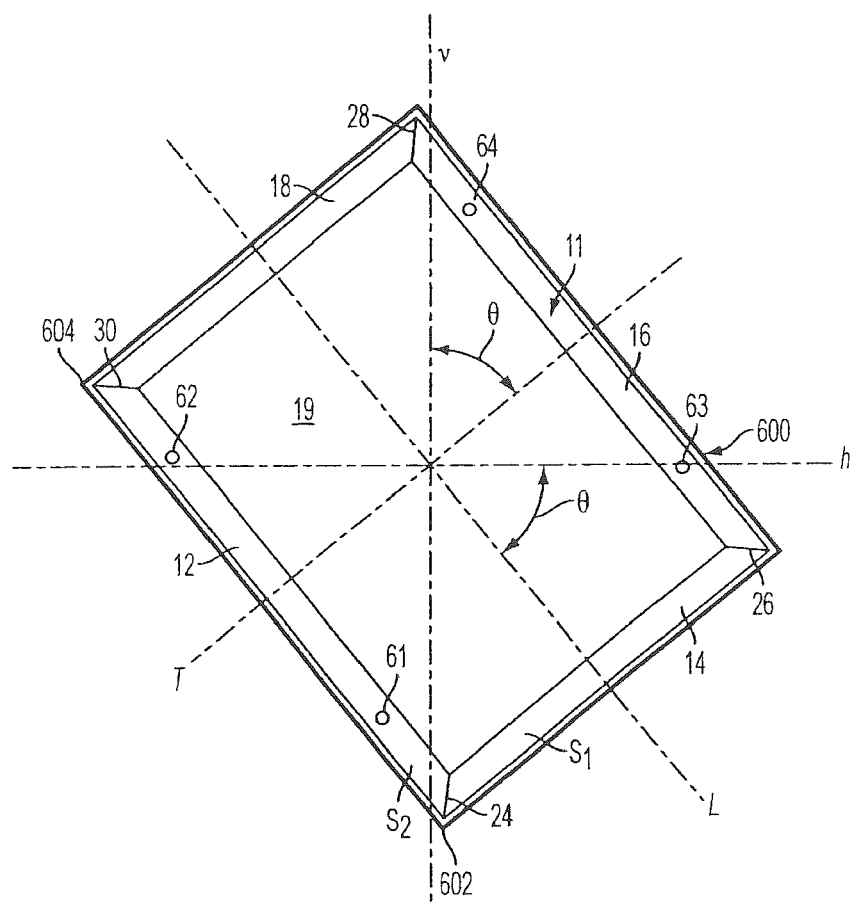
FIG. 36 shows a twenty-first embodiment where the window sash frame is positioned in an alternate orientation during assembly.

In an alternate construction method shown in a twenty-first embodiment in FIG. 36, frame 11 and belt clamp 600 assembly have been rotated clockwise from the arrangement shown in FIG. 35, with longitudinal axis L disposed at an angle θ to a horizontal axis h. Similarly, transverse axis T is disposed at an angle θ from a vertical axis v. When frame 11 is placed in this corner joining orientation, the vertex 602 of corner joint 24 points in a generally vertically downward direction. Such an orientation can be achieved by rotating frame 11 clockwise until the angles θ are preferably about 45°. During this phase of assembly, frame 11 can be supported in this orientation by a support jig, clamp arrangement, or assembly personnel (not shown). Angles θ also can be any angle sufficient to achieve proper joining as described in further detail below, such as, for example, 250, 30°, or 35°.

Once corner joint 24 is oriented as described immediately above, resin is injected into the corner joint. Preferably, an injection gun (not shown), adapted for dispensing resins, penetrates injection port 61 and dispenses resin into the internal cavity (not shown) of rail 12. The viscosity of the resin allows the resin to flow downward along the internal cavity of rail 12 into corner joint 24. Resin continues to be injected into the internal cavity of rail 12 to fill the internal cavities of rail 12 and stile 14 in the vicinity of the corner joint. The resin accumulating in the internal chamber of rail 12 causes the surface level s1 of resin in the internal cavity of stile 14 to rise, likely due to hydraulic pressure. Additionally, placing frame 11 in an orientation where longitudinal axis L and transverse axis T are positioned at a respective angle θ from horizontal and vertical will ensure that the surface level s1 of the resin in stile 14 rises at approximately the same rate as the surface level s2 of the resin in rail 12.

Preferably, a sufficient amount of resin is injected into the internal chamber of rail 12 such that the surface level s2 of the resin closely approaches the level of injection port 61. Once sufficient resin has been introduced into the internal cavity of rail 12 such that resin levels s1 and s2 are approximately equal with respect to vertex 602, injection is halted, allowing removal of the injection gun from the injection port. Frame 11 and belt clamp 600 assembly are held in the orientation shown in FIG. 36 for a sufficient time to allow the resin to solidify, at least partially, within corner joint 24. In an embodiment where BAYFLEX XGT-140 is used, the resin can be heated to around 90° F. prior to injection, which decreases the requisite time to solidify to approximately 20 seconds, and which allows the resin to flow adequately into the internal cavities of both members without decreasing the resin's viscosity to a level that would allow the resin to leak out of the corner joint prior to solidifying. In alternative embodiments, the resin need not be heated.

After the resin solidifies sufficiently to remain in place, the frame 11 and belt clamp 600 assembly are rotated approximately 90° in a counterclockwise direction from the orientation shown in FIG. 36 such that the vertex 604 of corner joint 30 points in a direction that is generally vertically downward. The resin is then injected into the internal cavity of rail 12 via second injection port 62 using the same process discussed above in connection with corner joint 24. A sufficient amount of resin should be introduced into corner joint 30 such that the surface level of the resin in both rail 12 and stile 18 is approximately equal. Once the resin injected in to corner joint 30 has had an opportunity to at least partially solidify, the frame 11 and belt clamp 600 assembly are then rotated 90° again and the resin injection step is repeated for corner joint 28 via injection port 64. To complete the forming process, the frame and belt clamp assembly are again rotated by about 90°, and resin is injected into corner joint 26 via injection port 63 according to the injection step described above. Alternatively, instead of rotating frame 11 counterclockwise so that corner joint 30 is filled after corner joint 24, the frame 11 and belt clamp 600 assembly can be rotated clockwise, so that corner joint 26 is filled after corner joint 24, and so on. Additionally, corner joints can be filled in any order by simply rotating the frame 11 and belt clamp 600 assembly so that the vertex of the desired corner joint points generally downward prior to injecting the resin.

With the joints filled, the injection ports can be sealed with, for instance, plugs, caulk, or sealant as appropriate. Alternatively, the injection ports can be formed within a region such as in the glazing bed or groove so that they are covered and sealed by the glazing or other components added to the frame. Once all corner joints have been filled with resin and the resin has properly solidified, the belt clamp or other clamping mechanism can be removed, and the frame can be further processed by, for example, adding window glazing, sliding hardware, and/or the like, before placing the frame into service according to its design specifications.

Figure 37:
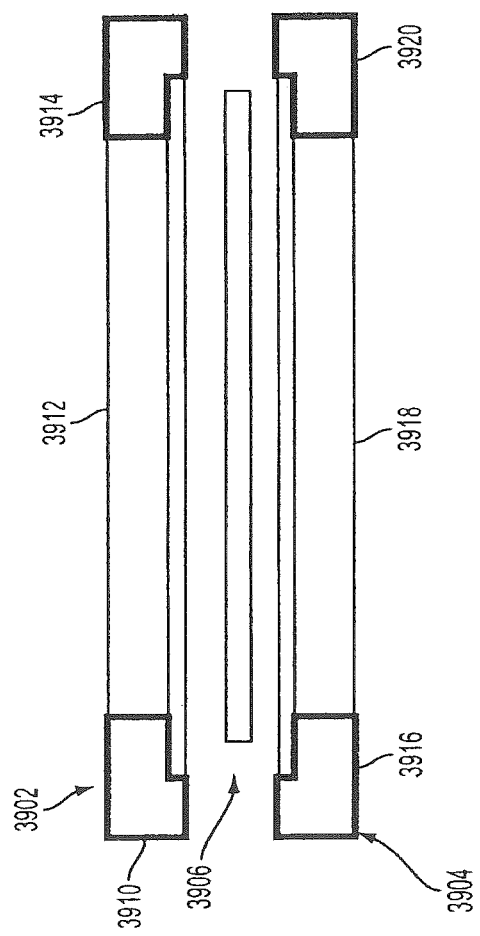
FIG. 37 shows a twenty-second embodiment forming a window unit by sandwiching insulating glazing units between sashes.
Figure 38:
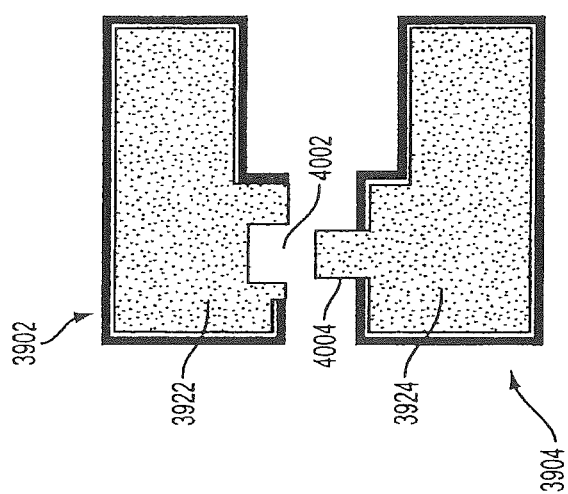
FIG. 38 shows a system for positioning sash members in a glazing system.

Inserts, and, alternatively, molded-in features, can also be used as locators for positioning and fastening one member relative to another. FIG. 37 shows a window unit formed by sandwiching insulating glazing unit 3906 between a first sash 3902 and a second sash 3904. In this twenty-second embodiment, sash 3902 comprises members 3910, 3912, and 3914, plus a fourth member, not shown, to complete a rectangular structure surrounding and supporting insulating glazing unit 3906. These members have cavities therein that generally extend through the entire length. In a similar manner, sash 3904 comprises members 3916, 3918, and 3920, and a fourth member (not shown). A system for positioning sash members in this type of glazing system is shown in FIG. 38. FIG. 38 shows locating recess 4002, which is shown formed of resin 3922, molded into first sash member 3902 using the methods disclosed herein, and mating locating protrusion 4004, which is shown formed of resin 3924, molded into second sash member 3904 using similar methods. A suitable number of such features can be molded into the sashes, to provide positive location(s) to fit the two sashes together.

Figure 39:
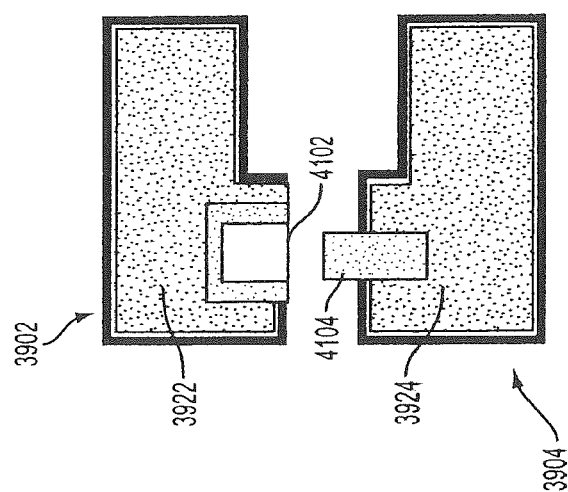
FIG. 39 shows a twenty-third embodiment using locators as inserts.

Locators can also comprise inserts and are shown in a twenty-third embodiment in FIG. 39. FIG. 39 shows insert 4102 in sash member 3902 receiving insert 4104 in sash member 3904 to produce a positive location of member 3902 relative to member 3904. Inserts 4102 and 4104 can also serve a fastening function and can include teeth, serrations, springs, or other mechanical features, for example, to fasten the sash members together upon insertion. Alternatively, inserts 4102 and 4104 can be made of a weldable thermoplastic material that can be welded together using vibration welding, ultrasonic welding, or other thermoplastic welding methods. Fastening methods involving mechanical deformation of heated thermoplastics can also be used, where suitable.

Figure 40:
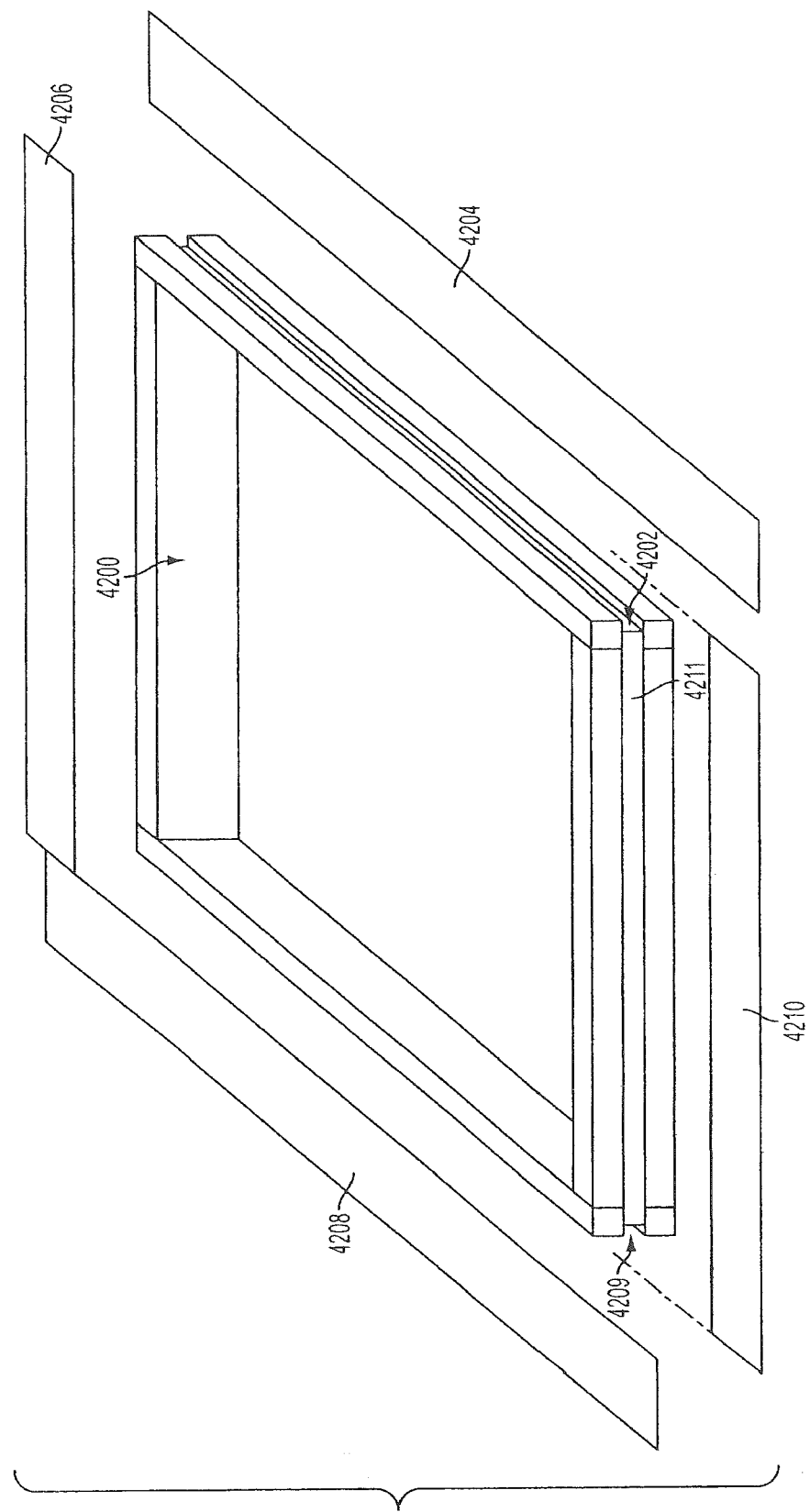
FIG. 40 shows molding features onto members without cavities.
Figure 41:
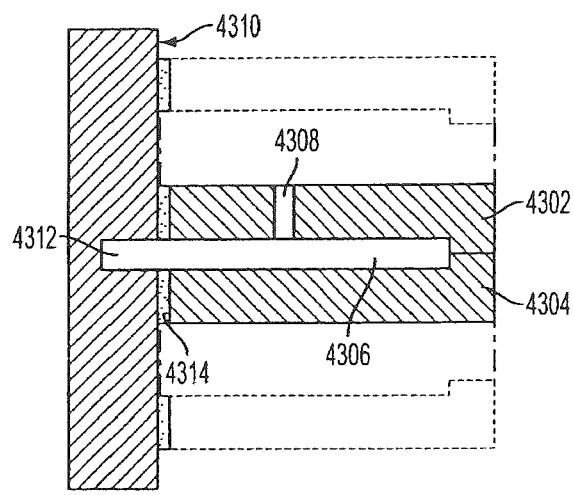
FIG. 41 shows another mold for forming an external flange feature.
Figure 42:
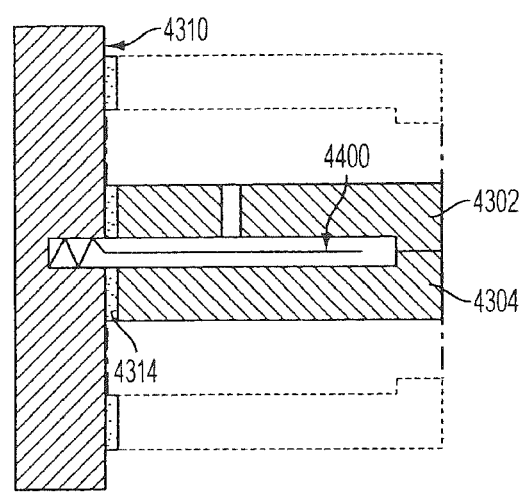
FIG. 42 shows using molded parts to form a continuously sealed nailing flange.

Features can also be molded onto members that do not necessarily comprise cavities extending the entire length of the members or where the members are not hollow. As shown in FIG. 40, rectangular window frame 4200 can be formed of wood or other suitable material. Kerfs 4202, 4211, and 4209 are provided to receive nailing flanges 4204, 4210, and 4208, respectively. An additional kerf, not shown, receives flange 4206. The nailing flanges can also provide, in addition to the structural function of supporting the window frame when installed in a building, a sealing function to help prevent air and water intrusion into the building in which the window is installed. With existing methods of joining members it has been difficult to achieve reliable sealing of the flanges at the corners, where the separate flanges meet. FIG. 41 shows a mold including first part 4302 and second part 4304 being placed against member 4310. The mold can be held against member 4310 at 4314. Mold cavity 4306 is in communication with kerf 4312. Optionally, mold parts 4302 and 4304 can entirely surround member 4310, or can extend only around the corners of the frame to cover the portions of the nailing flanges in the corner regions. FIG. 42 shows mold parts fitting over nailing flange 4400, along with a second nailing flange (not shown) to provide a tight, continuously sealed nailing flange at each corner. Sealing layer 4314, as shown in FIGS. 41 and 42, seals against member 4310 to prevent leakage of resin. Sealing layer 4314 can be formed of a material softer than the members.

As briefly discussed above, fixturing can provide a method of joining of members with cavities therein by the positioning of the members during the injection and solidifying steps of the assembly process. Because the resin is a flowable material prior to solidifying, critical dimensions of the assembled structure can be determined by the fixturing system, with less concern for dimensional tolerances of component parts. Moreover, joining, along with appropriate fixturing, provides a designer greater freedom to choose which dimensions of the assembled unit are critical. Variations of fixturing, in general, depend, at least in part, on which dimensions are chosen to be critical. Critical dimensions of an assembled unit can be controlled by the use of whole unit fixtures. One type of a whole unit fixture is shown generically as fixture 4500 in FIGS. 43 and 44. This type of fixture generally is used when the critical dimensions are the gaps at the interfaces between parts being joined. Referring to FIG. 44, fixture 4500 utilizes base plate 4502 and clamping elements 4504, 4506, 4508, and 4510, which are slidably mounted to base plate 4502, to hold workpieces such as members 4602, 4604, 4606, and 4608, in a planar configuration, while clamping them together by urging fixture elements 4504, 4506, 4508, and 4510 against them, thereby minimizing the gaps at interfaces 4601, 4603, 4605, and 4607, and forming assembled unit 4600. Clamping the members together in this manner during injection and solidifying of the resin minimizes leakage at the joint interfaces.

Figure 45:
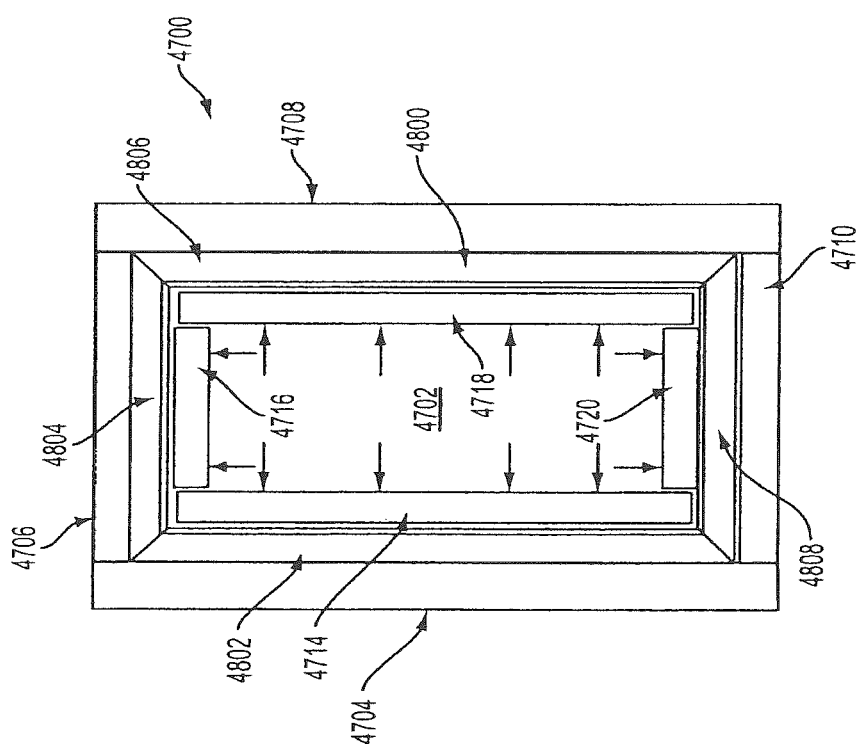
FIG. 45 shows a whole unit fixture used to form a frame where the peripheral dimensions of the assembled unit are the critical dimension.

If it is determined that the peripheral dimensions of an assembled unit, rather than the gaps at the interfaces, are the critical dimensions, an alternative fixture, such as the one shown in FIG. 45 and indicated generally at 4700, can be used. In FIG. 45, base plate 4702 supports a peripheral fixture, with elements indicated at 4704, 4706, 4708, and 4710, which are fixedly attached to base plate 4702 and precisely located to define the peripheral dimensions of assembled unit 4800 comprising members 4802, 4804, 4806, and 4808. During assembly of a unit, the members are first placed in the fixture in the manner shown. A sliding fixture, with elements indicated at 4714, 4716, 4718, and 4720, is then pressed against the members to urge them into contact with peripheral fixture elements 4704, 4706, 4708, and 4710, thereby determining the peripheral dimensions of assembled unit 4800. After members 4802, 4804, 4806, and 4808 are urged into place against the peripheral fixture elements, injection and solidification is performed in the manner described hereinabove, resulting in a finished unit having critical peripheral dimensions precisely determined by the fixture.

When fixturing is used to determine critical dimensions, generally it is assumed that the component parts making up the assembled unit are sufficiently precise in their dimensions to assure that other, non-critical, dimensions will still fall within acceptable dimensional tolerances.

Figure 43:
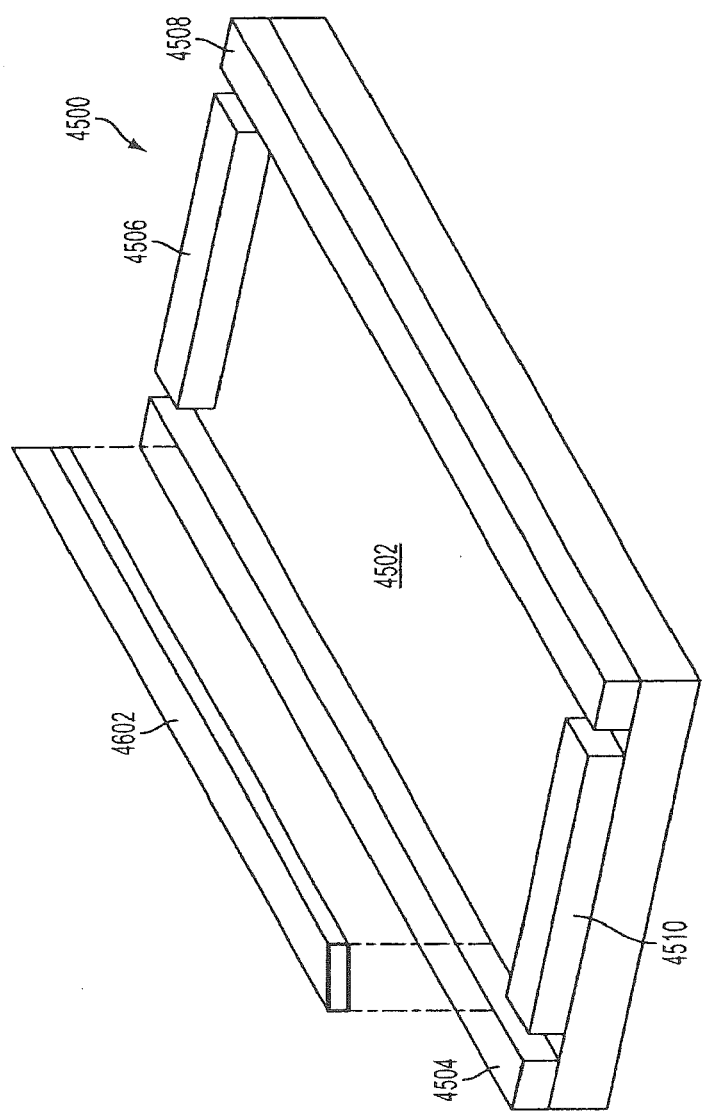
FIG. 43 shows a whole unit fixture used to form a frame where the gaps at the frame interface are the critical dimension.
Figure 44:
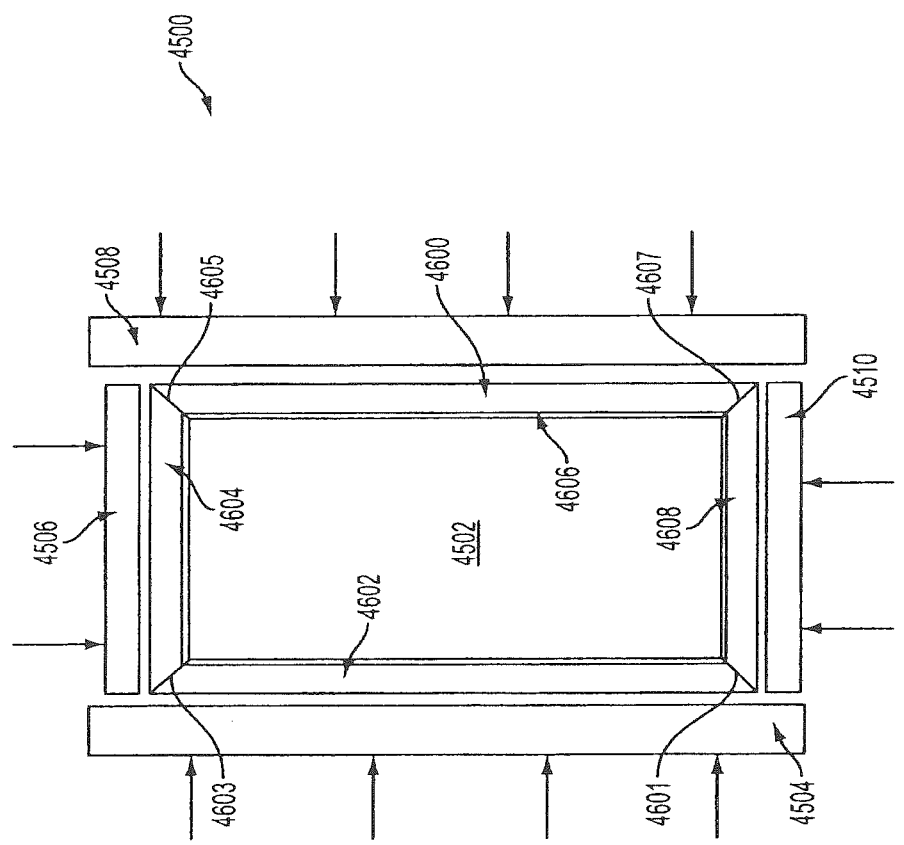
FIG. 44 shows members forming the frame in the whole unit fixture of FIG. 43.

Although FIGS. 43, 44, and 45 show specific features, several elements are exchangeable with several components not shown and can be interchanged in a variety of ways. For example, the urging of the sliding members against the parts being joined can be provided by manual or powered devices. Sliding members could be operated by air or hydraulic cylinders, or other fluid operated devices. Use of such devices, while only one alternative method, would have the advantage of controlling the clamping forces by controlling the fluid pressures involved. Alternatively, mechanical devices using springs can also be provided. In addition, the mechanism for determining the path of the sliding members can also be provided in a variety of ways. For example, mechanical slides can be useful, or, if air or hydraulic cylinders are used, the cylinders themselves can be used to determine the paths of the clamping members. Additionally, while the clamping members have been referenced as sliding members, pivoting arms or linkages can also be used to provide movement. Also, additional clamping in a direction generally perpendicular to the base plate can be provided to hold the workpiece members in contact with the base plate during clamping. Fixturing members can additionally provide covering for joint interfaces to limit leakage of resin and improve surface smoothness in the interface area.

Materials suitable for the various parts of the fixtures are not particularly limited, although aluminum can generally be used for the base plate and sliding members. Other materials, such as polymeric materials, can be useful for portions of the fixtures that contact the workpieces, if marring, scratching, or other damage to the workpiece is a concern. In areas where the fixture is used to reduce leakage of resin at joint interfaces, that portion of the fixture generally is formed of a resilient material to act as a seal during injection and solidifying. Portions of the fixture that contact the resin can be made of non-adhesive materials such as silicones or fluoropolymers.

Another example application of the present joining methods is for joined members that generally have thin profiles adapted to receive inserts. Thin profile members, such as screen doors, generally have profiles slightly less or greater than one inch in width. Traditional methods of boring openings or cavities in such thin profiles can be difficult in certain types of materials. Accordingly, use of the present joining methods can overcome these difficulties. A cavity can be formed in be used to join an insert with a member where the insert is a lock or a hinge and where the lock width and the door width are substantially similar. Also, if the door has a first outer wall and a second outer wall with a door space therebetween, the first outer wall has a first outer wall thickness, the insert is a lock with a lock plate face having a lock plate face thickness, then the lock plate face thickness can be less than the door width, but greater than the first outer wall thickness plus the door space thickness and the lock can be secured using the joining methods detailed herein.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A method of forming a fenestration frame comprising:
   (a) placing members of the frame in joining positions to form a continuous frame with joints between the members; the joint including a first joint and other joints;
   (b) fixedly holding the members in the joining positions to form a joining assembly;
   (c) orienting the joining assembly to place the first joint at an elevation below the other joints;
   (d) following step (c), injecting a resin into the first joint and allowing it to at least partially solidify;
   (e) following step (d) rotating the joining assembly until a second joint of the other joints at an elevation below the first joint and the other joints;
   (f) following step (e) injecting resin into the second joint and allowing the resin to at least partially solidify; and
   (g) repeating the rotating, injecting, and solidifying steps until all of the joints have been injected with the resin.

2. The method of claim 1 wherein the members are fixedly held together by a belt surrounding the members.

3. The method of claim 1 wherein the members are held together by a clamping mechanism.

* * * * *